United States Patent [19]
Pryor

[11] Patent Number: 6,161,055
[45] Date of Patent: Dec. 12, 2000

[54] METHOD OF DETERMINING TOOL BREAKAGE

[75] Inventor: Timothy R. Pryor, Tecumseh, Canada

[73] Assignee: Laser Measurement International Inc., Windsor, Canada

[21] Appl. No.: 08/566,449

[22] Filed: Dec. 1, 1995

Related U.S. Application Data

[63] Continuation of application No. 08/335,825, filed as application No. PCT/US93/04857, May 17, 1993, abandoned.

[51] Int. Cl.[7] .................................................. G06F 19/00
[52] U.S. Cl. .......................................... 700/175; 382/152
[58] Field of Search ........................ 364/474.16, 474.17; 382/152, 204; 408/6, 16, 8; 702/34; 700/174, 175, 177

[56] References Cited

U.S. PATENT DOCUMENTS

| | | | |
|---|---|---|---|
| 3,817,647 | 6/1974 | Lemelson | 408/8 |
| 3,829,750 | 8/1974 | Centner et al. | 318/561 |
| 4,031,368 | 6/1977 | Colding et al. | 235/151.11 |
| 4,181,077 | 1/1980 | Dalton | 101/401.1 |
| 4,373,804 | 2/1983 | Pryor et al. | 356/1 |
| 4,394,683 | 7/1983 | Liptay-Wagner et al. | 358/107 |
| 4,403,860 | 9/1983 | Pryor | 356/375 |
| 4,453,085 | 6/1984 | Pryor | 250/203 R |
| 4,547,847 | 10/1985 | Olig et al. | 364/148 |
| 4,574,199 | 3/1986 | Pryor | 250/561 |
| 4,576,482 | 3/1986 | Pryor | 356/376 |
| 4,585,350 | 4/1986 | Pryor | 356/375 |
| 4,667,231 | 5/1987 | Pryor | 358/107 |
| 4,774,751 | 10/1988 | Pryor | 29/407 |
| 4,869,813 | 9/1989 | Bailey et al. | 364/478 |
| 5,007,204 | 4/1991 | Ibe et al. | 51/165.77 |
| 5,084,827 | 1/1992 | Demsey et al. | 364/474.37 |
| 5,088,239 | 2/1992 | Osman | 51/165.71 |
| 5,255,199 | 10/1993 | Barkman et al. | 364/474.17 |
| 5,345,390 | 9/1994 | Greenip, Jr. et al. | 364/474.17 |
| 5,361,308 | 11/1994 | Lee et al. | 364/474.17 |

FOREIGN PATENT DOCUMENTS 57-48462  3/1982  Japan .

OTHER PUBLICATIONS

Centner, R.M.; Idelsohn, J.M.; "Adaptive Controller for a Metal Cutting Process", pp. 154–161 (May, 1964).

Lymburner et al., "NonContact Gauging for Feedback Control of a Turning Process", presented at SME's "Noncontact Gauging & Inspection", Dearborn, Michigan, Sep. 29–Oct. 1, 1987.

McCabe et al.; "In–Process Control of Turning", presented at Rock Island Arsenal Demonstrations of In–Process Control, Sep. 29, 1989.

*Primary Examiner*—William Grant
*Assistant Examiner*—Steven R. Garland
*Attorney, Agent, or Firm*—Larson & Taylor PLC

[57] ABSTRACT

A method of determining the breakage of a tool in a machine tool is disclosed. The method automatically senses a physical characteristic of the operation of the machine during a cutting operation. Then, if the sensed value indicates a potential break in the cutting edge of the tool, an electro-optical sensor used to examine the shape of the tool and to automatically determine whether the tool shape is also indicative of tool breakage.

9 Claims, 14 Drawing Sheets

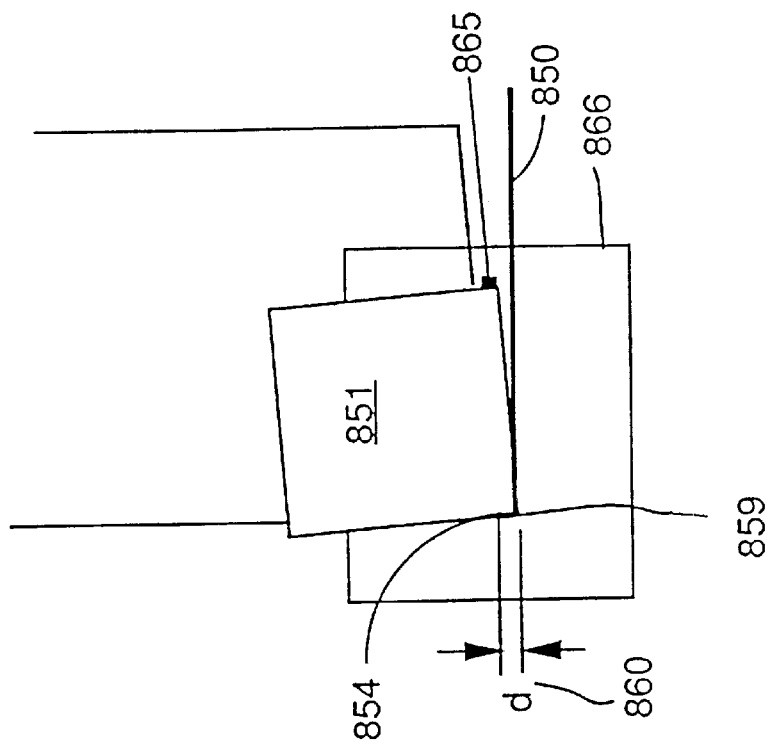
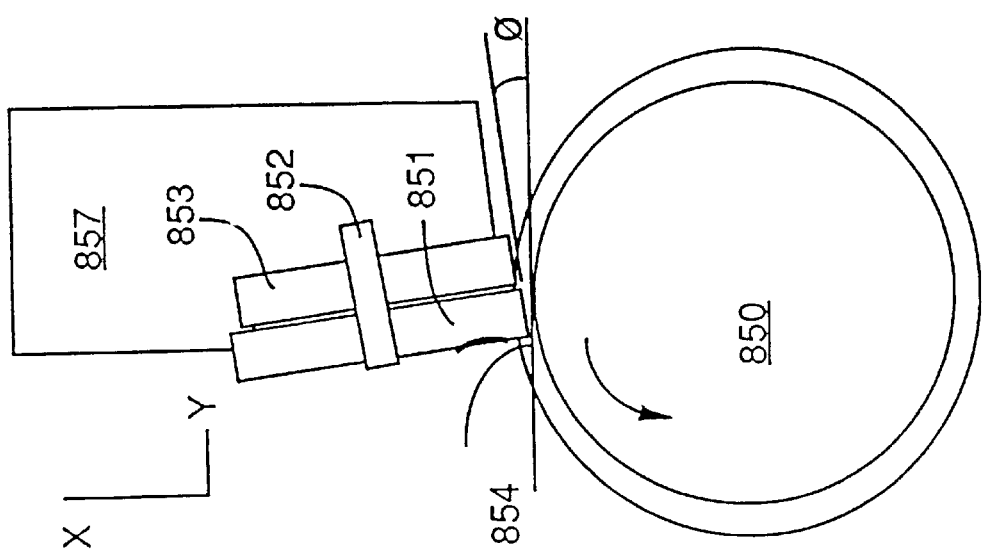
FIG. 8B
FIG. 8A

FIG. 8C
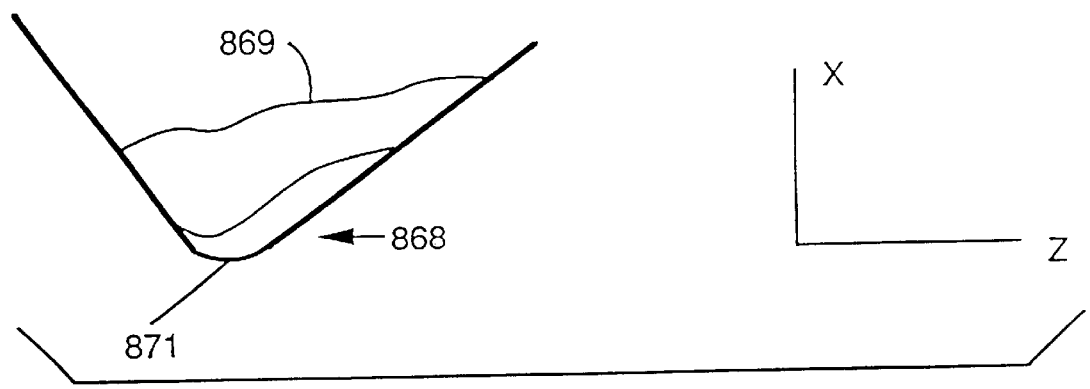
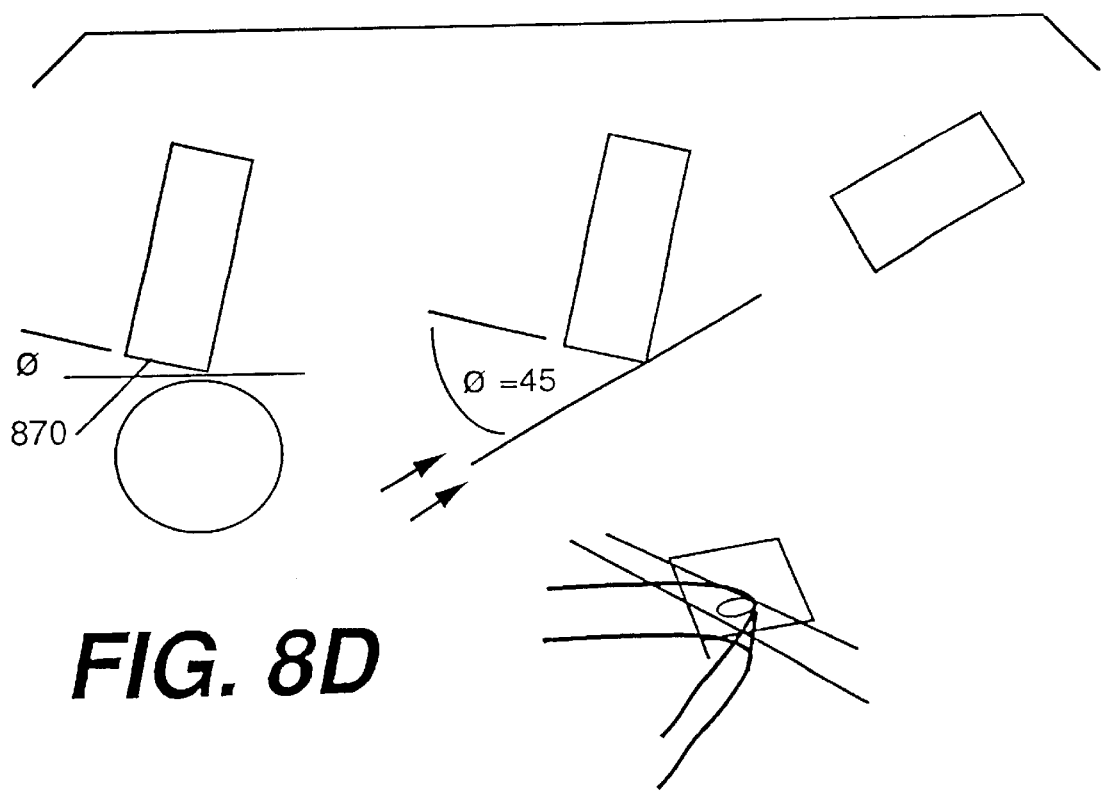
FIG. 8D

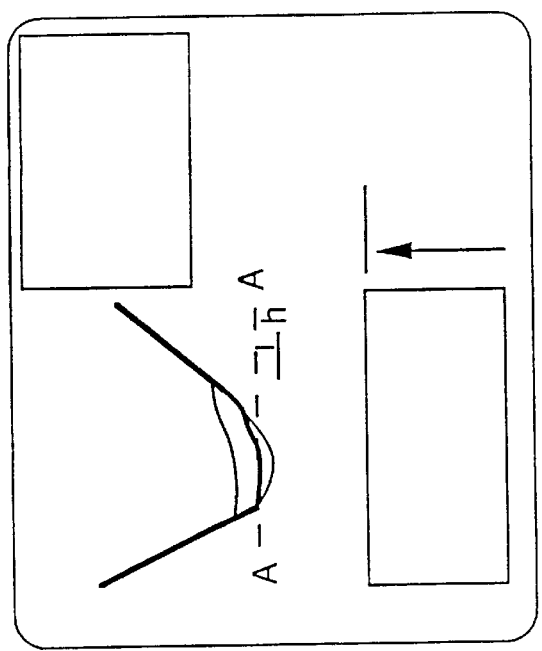
FIG. 8E
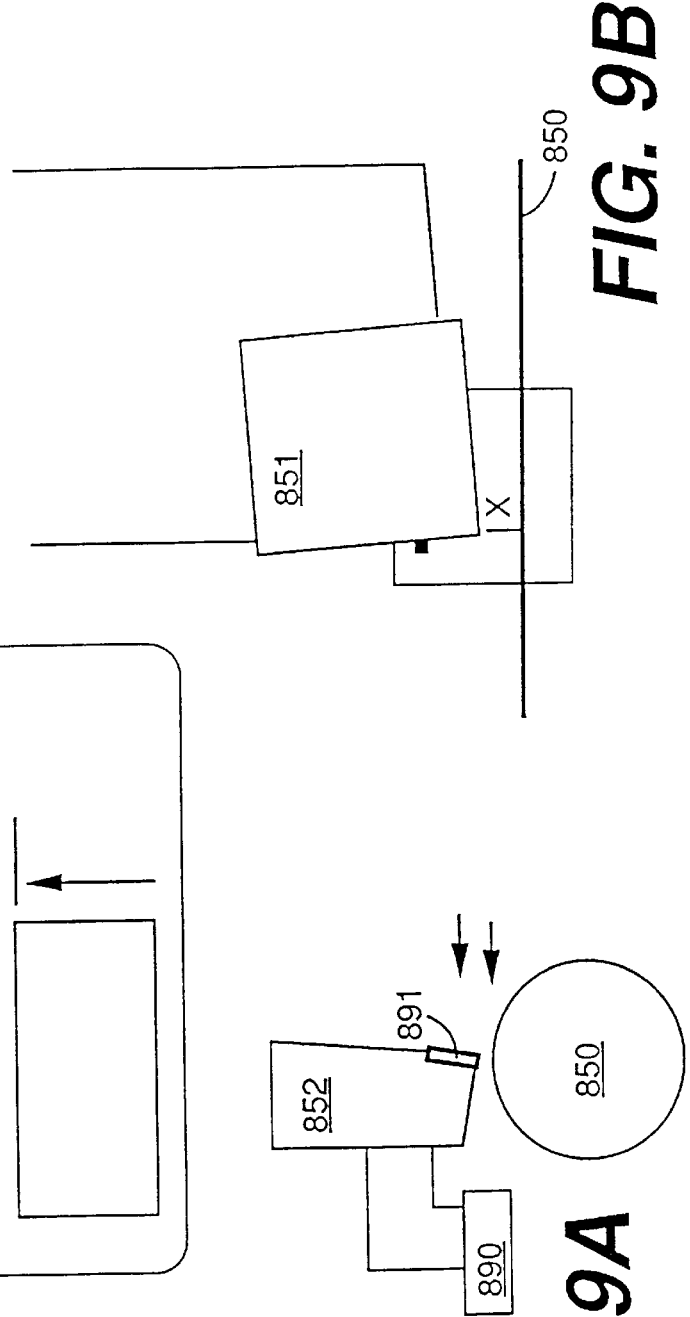
FIG. 9B
FIG. 9A

METHOD OF DETERMINING TOOL BREAKAGE

This application is a continuation of application Ser. No. 08/335,825 filed Jan. 31, 1995, now abandoned; which is a 371 of PCT/US93/04857 filed May 17, 1993.

REFERENCES

U.S. PATENTS 1. 4,373,804 Method and apparatus for electro-optically determining the dimension, location and attitude of objects.
2. 4,394,683 New photodetector array based optical measurement systems.
3. 4,453,085 Electro-optical systems for control of robots, manipulator arms and coordinate measurement machines.
4. 4,667,231 Electro optical part inspection in the presence of contamination and surface finish variation.
5. 4,774,751 Electro optical and robotic casting quality assurance.
6. 4,576,482 Electro-optical inspection.
7. 4,403,860 Apparatus for determining dimensions (contact).
8. 4,574,199 Sensing location of an object.
9. 4,585,350 Pulsed Robotic Inspection.
10. 5,112,131 Controlled machining.
11. 4,753,569 Robot Calibration.

BACKGROUND

It is of major interest to industry to eliminate the use of coolants wherever possible in the manufacturing process, both for environmental and cost reasons. "Cutting dry" is best performed in most cases with ceramic, CBN and other cutting tools which desirably operate at elevated temperatures. However these tools are often brittle, in tolerant of mechanical or thermal shock, and unpredictable in their Time to failure in terms of parts cut, which makes them able to benefit from the adaptive control methods described herein.

It is also desirable where economically and technically feasible to add higher degrees of adaptive control to machining processes, such that benefits of increased quality and higher productivity can be obtained. Use of such adaptive control can greatly improve the use of machining processes to turn precision finishes and diameters in normal production processes, and facilitate finishing and grooving, using cutting tools, as opposed to grinding in hardened materials.

Adaptive control can also reduce set up time and the engineering time to integrate new processes.

This application concerns adaptive control aimed at solution of the above problems and others. Particularly considered are the high production processes, where such adaptive control techniques can optimize production in largely automated plants, where human intervention is often not possible. The key to all of these issues, is increased sensory capabilities in the machine, and the requisite software algorithms, etc. to deal with the sensed data.

To summarize:

Goals in part are to
  Facilitate coolant free operation.
  Reduce part variation in production.
  Improve machine accuracy.
  Increase tool life, and reduce effects of tool breakage.
  Increase machining rates via speed and feed optimization.
  Reduce scrap and improve stock utilization.
  Reduce downtime due to Tool adjustments, dimension verification, tool breakage and wear, machine breakdowns and crashes.
  Provide feedback to previous operations.

Despite the important potential of adaptive control of machining there has been very little actual implementation on the plant floor of such technologies. Even in the research community, the vast majority of research papers presented have all been concerned with force based variables in milling, turning, and grinding, which infer a condition being generated on the part, with very little attempt to actually relate to actual part or tool monitoring technologies; and their integration with the intelligence of the machining process.

The reason for this lack of attention is unknown, but probably relates to the difficulty in sensing of many of variables, particularly when the machining is wet, which precludes (or gave to many the impression of precluding) the otherwise very desirable non-contact sensors, particularly electro-optical.

PRIOR ART

In terms of actual prior art in the factory, there is very little (as pointed out above). The primary method of adaptive control in machine tools is the touch trigger type probe, in which a trigger point on the machine is used to touch the workpiece, or conversely a tool on the machine is used to touch a reference point on the machine base, in order to verify its tool setting or part size (from a knowledge of machine axes location at time of touch). These touch trigger probes, sold by a variety of vendors (Renishaw, Marposs, etc.) are prone to breakage in high production environments, and extremely slow to use, taking one data point at a time, and even then in a rather laborious manner. This slowness is a key inhibitor to the increased intelligence and adaptive control, and is addressed in this application. It is the provision of rapid accurate sensing approaches herein that allows the invention to provide great value to the user.

Previous prior art patents have addressed adaptive control, but have ignored the measurement using optical sensors in the machine tool, the rapid application of which yields key advantages as described herein. Of two known references showing optical sensors at all, Lemelson U.S. Pat. No. 3,817,647, and Colding, U.S. Pat. No. 4,031,368, only Colding treats the contamination issues caused by the environment of the machine or discloses anything capable of even the slightest chance of working to the accuracies required—or at all. However Colding's sensing is unworkable to the accuracies required for precise control, and does not address other aspects of the invention herein. Neither reference treats the intelligent use of data bases built up through operation of the machine, and the ramifications thereof.

In order to obviate the noted problems, there have been two tests in North America (that I am aware of), that have used a degree of accurate optical sensing in the machine. The first and most extensive is the work done by Rock Island Arsenal in the period 1985–1990 approximately, using sensors to look at the edge of end milled Howitzer tube slots, and, in another example, diameters in turning operations. In this latter application, it was demonstrated that during a dry cutting process, one could monitor while cutting and correct the machine in a dynamic manner with a substantial quality improvement.

Ford Motor Company, on its part, implemented a program where the actual sensing in the final analysis was performed outside the machine and used to feedback to the machine after the part has been removed. This however, included the additional variable of surface finish, albeit in a method that was not accurate enough to ensure sufficient control.

Neither activity has resulted in actual use in the machine of both finish and diameter as investigated by Ford, nor has it resulted in further implementation of diameter measuring in lathes, or end milled edges demonstrated at Rock Island. The reasons are unclear, but probably relate to the following.

First, the efforts above were not packaged in a manner that could be used directly in the actual production machine, particularly in a high volume application where the nearest term justification probably lies. Only the Ford effort attacks such an application, and only outside the machine.

Secondly, no auxiliary systems were developed, which could be used to calibrate the sensors on the machine, also taking into account the effect of workpiece thermal growth in higher precision applications, most likely to initially justify such a control system.

Finally, the seeming applicability to only the 10% of machining applications or less presently dry cut probably further dissuaded invention. Similarly, a general lack of knowledge of the capabilities of non contact optical sensors exists in the machine tool world. Few realize how effective they have been in providing highly accurate, drift free and trouble free measurements. Many installations with such sensors installed in 1980 are running today—in 2 and 3 shift operation. Without such non contact sensors as herein disclosed, the speed and accuracy to obtain the necessary part measurements in an affordable manner would not generally be possible.

Here disclosed therefore is what I feel are key ingredients to make these processes practical, and in so doing, dramatically improve manufacturing competitiveness. Disclosed are:

A method for controlling the machining process to cut effectively without the use of coolants and utilizing optical sensing of workpiece size, as well as thermal measurements of the workpiece temperature, the temperature rise in the workpiece (vis a vis pre cut conditions) and/or the distribution of temperature of the workpiece, and adjusting the effective size and resultant optimized tool location for same.

Also disclosed is a method for monitoring tool force or vibration and combining the results with in machine measurement of part surface finish or tool profile Also disclosed are methods for monitoring the temperature distribution of parts, or the monitoring of temperature, magnitude or distribution after cutting, and inferring the effects of such temperature back to a preset table to correct future parts.

Also disclosed are methods of measuring the temperature of the part after machining, and if certain temperature limits are exceeded, modifying a final pass, in order to account for this temperature or temperature distribution.

Further disclosed is a method of optimizing surface cutting speed in which the machine and tool combination the speed of rotation of the tool, the feed, and the depth of cut can all be altered to approach the point at which chatter occurs. The size and finish just below those points is monitored and If they are acceptable this is probably the maximum that can be obtained.

Disclosed is a method to dimensionally qualify incoming parts and any rough machined surfaces thereon from previous operations.

Further disclosed is an improved technique for monitoring the wear of the tool. Disclosed further are methods for monitoring as well the tool temperature and predicting tool life in addition to the required adjustments on position of the tool.

Further disclosed is a method for controlling a machining process, wherein both tool force and a sensed variable of dimension or finish are measured and the position of the tool or drive parameter of the machine, such as feed or speed, is adjusted.

Further disclosed is an improvement in turret lathes, utilizing a sensory system for size, diameter/radius, length, or depth of cut, groove dimension or finish, located in the turret of the lathe.

Further disclosed is an improved form of two turret (4 axis) lathe, with sensors in either turret. Further disclosed in this regard is the sensing of the workpiece, with sensors in one turret, as well as the use of the sensors to sense the tools, or other object datums in the opposite turret. Included here, as well, are methods for operating machines having sensor units in two discrete carriers above and below the work, as well as tracking tools that are machining the workpiece, using the sensors in the opposite turret.

Further disclosed is a method for machining rotating parts, as in turning and grinding, wherein the part, while being machined is being sensed from above, and being worked on below, in order to create a minimum contamination situation.

Also disclosed is a method for monitoring the cutting of a workpiece with the sensor unit looking both at the tool and the workpiece simultaneously to determine static or dynamic relative location (the latter indicative of chatter), which causes a high frequency and small magnitude variation in the location of the tool to workpiece, and an unwanted perturbation of the surface finish of the part.

Further disclosed is a method of calibration of the sensors used in such applications, as well as the machines in the machine position, and the machine servo control variables.

Further disclosed is a method of controlling the machining process, comprising the input of force finish, size, tool edge condition of part, temperature, and the control of the process in the groups of said variables.

Also disclosed is an improved Machining process, incorporating sensing of turned finish in size or length, where additional operations improve the size of the parts, such as additional cut passes.

A method of measuring tool wear is disclosed using both optical and force or vibration sensors Further disclosed, and unlike the prior art, I have also found that certain circumstances going too slow in feed rate can also cause a deterioration of certain surface finishes. It is the goal of the invention therefore to be capable of dithering the speeds or feeds in both directions until the optimum feedrate or spindle speed is obtained for a given surface finish.

While this disclosure primarily illustrates the systems aspects of such machining operations, novel sensor technologies are herein disclosed as well. Others can be found in numerous patents applications, and granted patents by the inventor and his co-workers.

It should be noted that unlike present control systems for machine tools, which execute a preplanned path, this system allows for the modification of the path, either in terms of the number of cut steps, mixture of cuts, or even within a cut path as a result of the sensed variables. Indeed the matrix array based two axis sensor can sense ahead of the cut, at the actual cut location, and behind it on the just cut diameter, in order to modify the path, speed, feed, tool, etc as necessary.

The invention is illustrated in the following figures:

FIG. 1 illustrates a basic embodiment of the invention, in which an NC turret lathe, known in the art, is equipped with sensors located in the turret as herein described. These sensors are equipped to measure the diameter or equivalent radius of the part, the length, the surface finish, and to determine forces of cutting. The invention includes the use of any or all of these sensors, and in combination, to improve machining, quality of the workpiece, as well as increased up time, and machining performance. Further illustrated are sensor and machine calibration and sensor display, and detail on a tool sensing embodiment.

FIGS. 8A, 8B, 8C, 8D, and 8E illustrate additional tool sensing embodiments.

FIGS. 9A and 9B illustrate direct optical monitoring of cutting conditions.

Figure 10B:
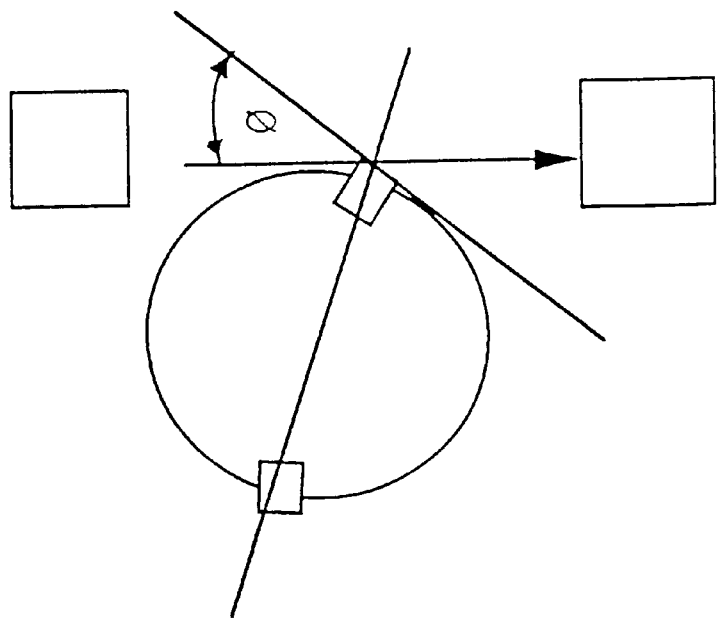
Figure 10A:
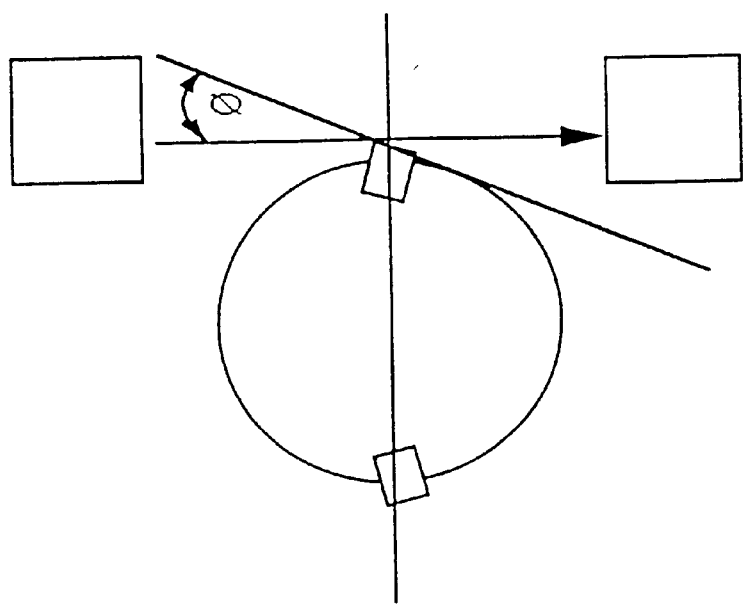
Figure 11:
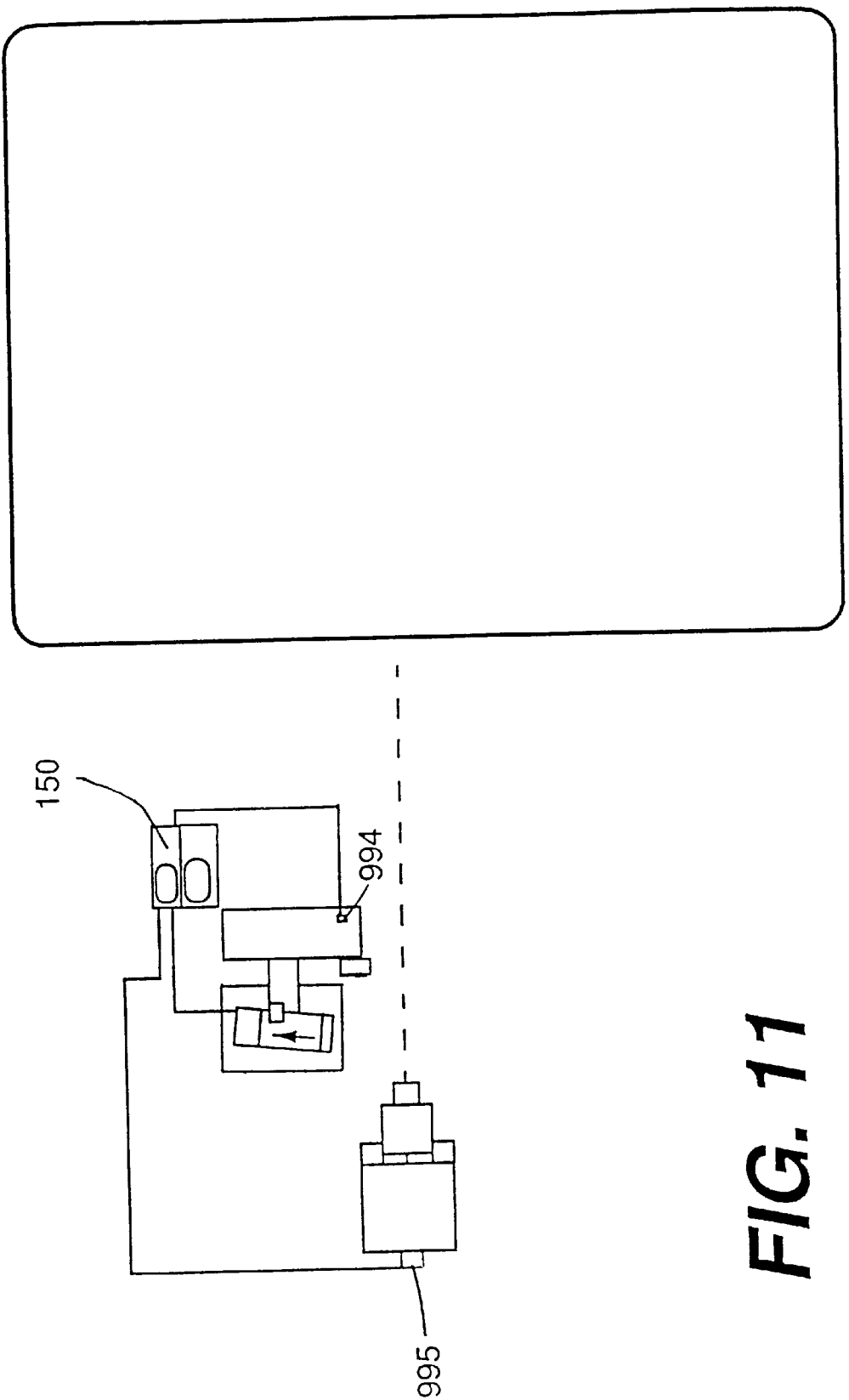

FIGS. 10A and 10B illustrate a method for inspecting tools, for example boring tools, from different angles FIG. 11 illustrates a tool sensing trip wire confirmation embodiment of the invention.

FIGURE 1

Figure 1:
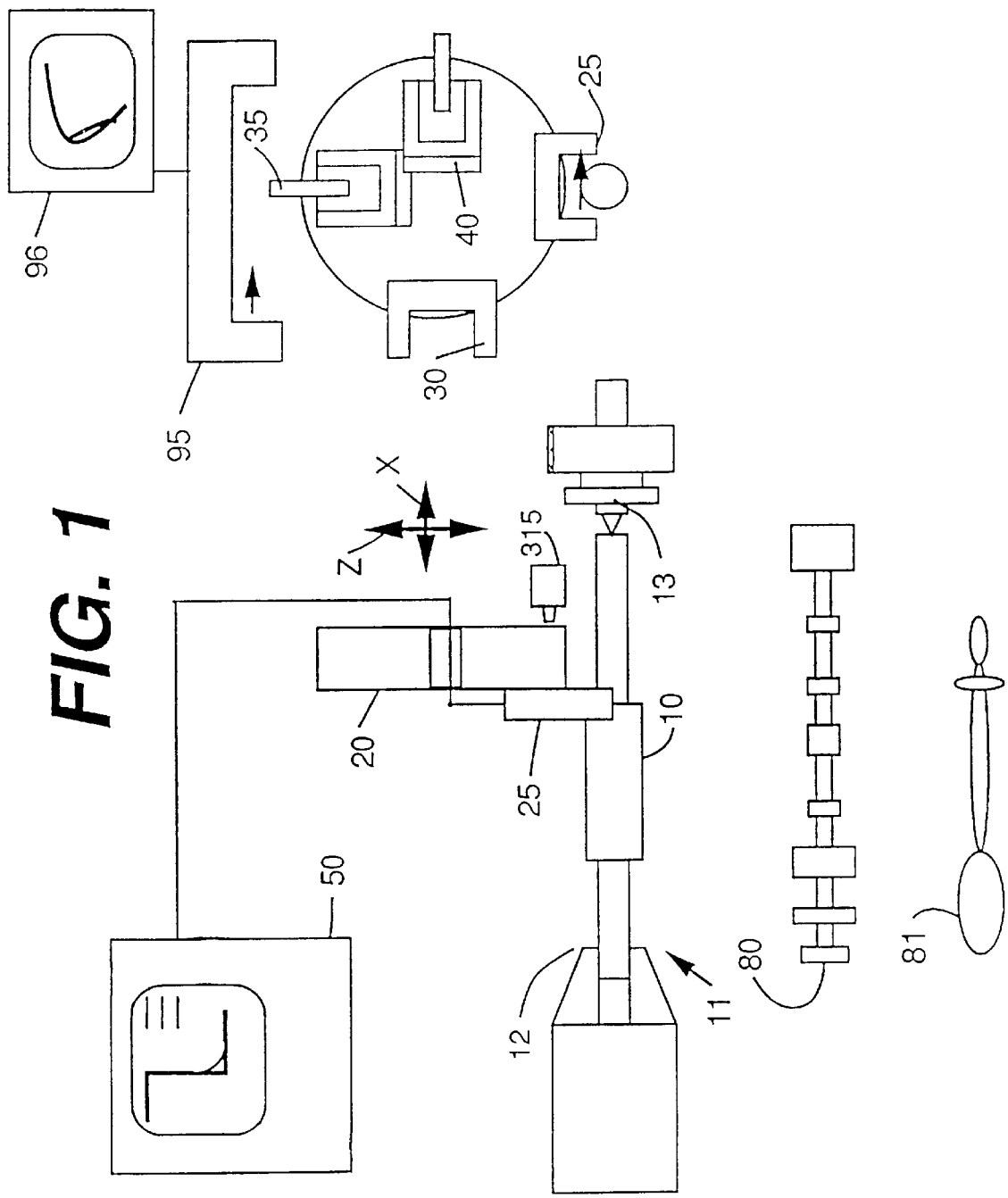

FIG. 1 illustrates a basic embodiment of the invention. A standard NC lathe, of which the working area is 11, is depicted, contains chuck 12 and tailstock with center 13 on which a workpiece 10 is mounted. A turret 20 is used to programmably position different tools such as 35 into working position in order to turn different diameters and lengths of diameters on the shaft. The turret is positionable by the machine in both x & z axes.

Typically the turret will have 8–10 tool positions to allow roughing and finishing tools to be put in or spare tools so that one doesn't have to be set up each time, but a group, for example, can be set up during down times, and simply indexed in when a tool breaks. The problem of tool set up will be addressed elsewhere, but it basically involves putting the tool tip at the correct location known to the machine, whether it checked after putting in and the machine is corrected, or its put in to a correct location. This particular operation is made much simpler by use of the invention herein.

In any case, in this particular illustration, two of the tool positions on the turret are occupied by sensors, in this case, preferably optical sensors, such as 25 to detect size, which is diameter and in the version shown, diameter and length simultaneously, and sensor 30, which detects surface finish of the particular outer diameters being precision turned in this application. Typically such applications are on hardened parts, Rockwell 58 to 64 approximately.

Figure 2:
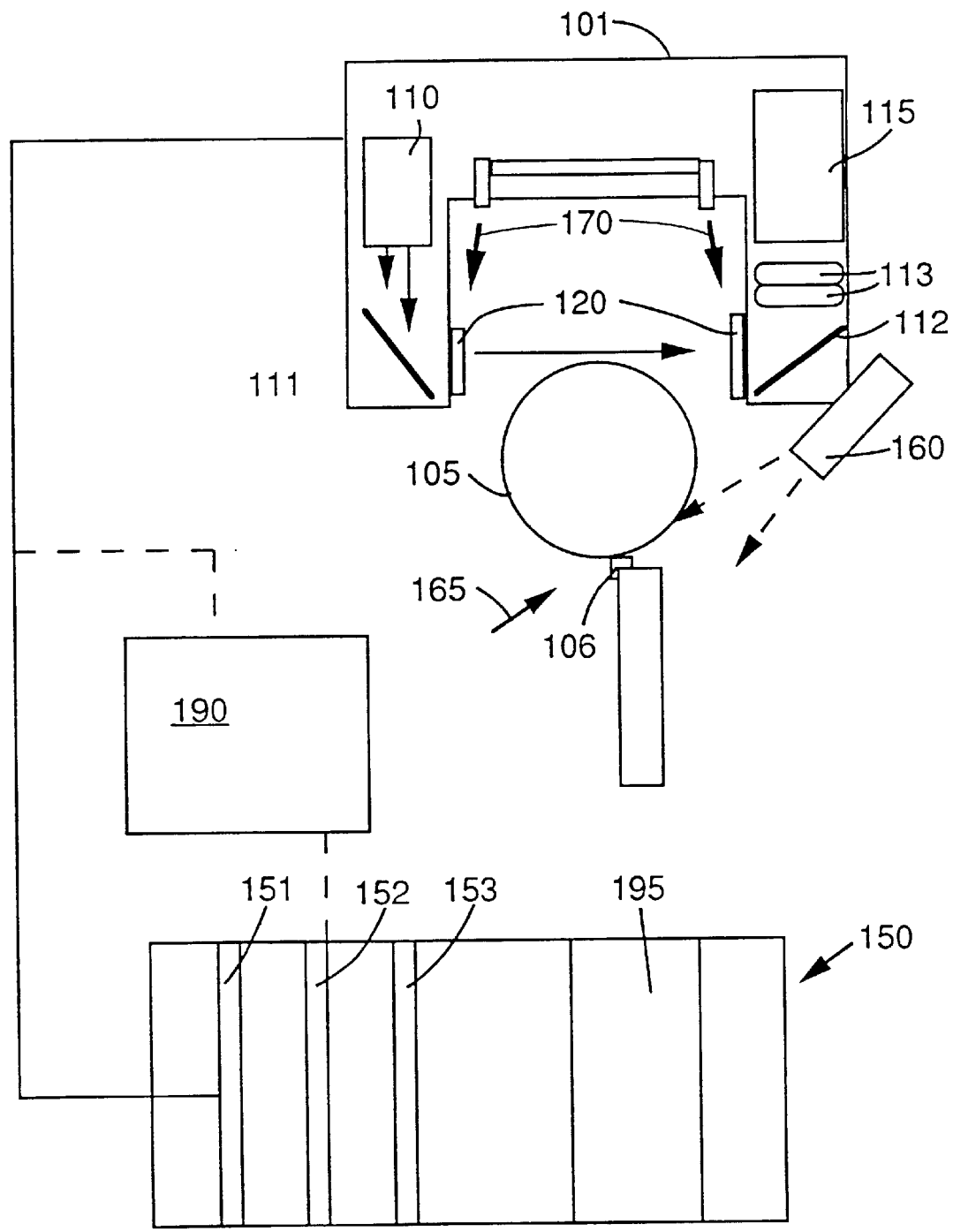
FIG. 2 is a Close up of radius/diameter size and length sensor with matrix array in a U shape, further including signal processing details.

The matrix array based sensor 25, shown in an operable position at looking at both a small and large diameter of the part that has been previously turned in another operational cycle of the machine, has its display 50 shown in this case as showing the processed data by the computer unit, to be described in FIG. 2, showing the magnified image of the part surface, and the data of the location of the step axially from the end of the part, or another datum, and the two diameters represented. If a radius is present, due to either a contour turning operation or due to simply tool wear, this radius is also shown and any dimensions on it that are desired are displayed.

It is noted that the invention can also be used to measure incoming cast or forged parts, for example. In this case, one might just simply display the raw video profile image of the part to give the operator a feel for what it looked like, although it to can be fully scanned and digitized as shown.

The purpose for scanning an incoming part, preferably after locating and clamping, is to determine if it is straight enough to clean up, that it has sufficient diameter stock for clean up for subsequent machining operations, and that it is not excessively large to cause undue machining time, or tool breakage, including large sections of flash that can snap tools. On the other hand, another reason to scan the incoming part is to determine the optimum cut path, in accordance with the amount of material present. Prescanning a part is also a form of collision avoidance, since misloaded parts, wrong parts and other problem conditions can sometimes occur in high production applications.

This provides a method to dimensionally qualify incoming cast/forged parts and any rough machined surfaces thereon from previous operations. It also provides a means to determine if excessive runout is present, indicative of malformed or contaminated location surfaces on the part or machine (and cause for reject of the part, to avoid waste of machining time').

All of these goals can be expeditiously done with the invention as shown, which is capable of making very rapid measurements. Even relatively simple means can achieve on the order of 5–10 measurements per second, and in the near future with specialized chips this should go at least to the frame rate of the RS170 standard camera utilized (30/sec).

By measurements in this case, per second is meant that the whole amount of data in the field of view is measured, to whatever extent is required, such as the length and diameter in the case shown, the length location of this step and the two diameters, plus any radial data is necessary. It is noted that as shown in the references it is also highly desirable to reject outlying data that may be indicative of Dirt or chips, or coolant residue, etc. on the part, and this processing also has to occur within the time.

The sensor operation will be describe in FIG. 2, and basically operates from profile imaging of the part, as described in the references above.

It is noted that no such capability as depicted herein, is presently available on any known lathes or machine tools today. The operator display alone is an extreme value for operator understanding of what is occurring in the process, and for set up of the machine and tools. However, the most value comes when the display in the processing unit shown is connected to the controller to allow the true input of intelligence into the machine. Such connections are not easy to perform today, because of the limited capability of present day controllers. This is an area which is receiving intense effort today in certain circles (such as the U.S. Next Generation Controller Project).

In order to keep the sensor unit functioning, two forms of calibration devices are shown. Calibration bar 80 is used periodically to check the correct x and z locations of the sensor used to inspect the bar, and in reality therefore, represents a machine check if the sensor has been previously calibrated using the master rings as shown. The sensor being a digital device and drift free, and one that can also really be calibrated only at the mean, but for confirmation of the plant purposes are usually calibrated at the maximum and mean of its range, or even more particularly of the range and diameters of a particular shaft that is being made in high production.

The various diameters and axial locations of the lands thereon, on the calibration shaft 80 can be in any desired size variation, location, etc., and would typically have, we feel, many more steps, and often smaller as well, then that depicted for clarity in the drawing. In this way the sensor unit can check each in turn, and determine the small offsets to the machine control (typically in the range 1–4 microns), required to update the position of the machine, compared to where it is suppose to be.

In periods of high thermal change, this becomes particularly important as the range of variation location can range from 20–50 microns. It is noted too that the shaft 80 can be made of the same type of material as the machine itself, or of the part being produced, or of in bar, with no thermal change whatsoever to speak of, depending of the goals of the calibration. Because the sensing is fast and quick, and calibration can be accomplished rapidly, and does not take an excessive amount of time from the cycle of the machine, it can be placed in the machine by the operator or automatically loaded by gantry robots used to load the parts.

Calibration artifact 81 is quite different. It is used to calibrate the servo axis of the machine, or a following error, and correct same. This is absolutely impossible today with current controllers to check this in the field, and is a very big task even during the manufacturing of the machine. It can be accomplished routinely with the system here proposed.

However, in order to measure rapidly enough, the matrix array sensor unit, shown in FIG. 2, is generally insufficient, and a much higher speed linear array capable of thousands of diameter readings a second is required. Such linear arrays may be co-located with the matrix array, or used instead of it, or simply used in another tool sensor position on the machine. A linear array, further, has the advantage that it can be used over much larger ranges as well, but it does not as good a length measuring capability, and cannot in one view display the image shown on the display 50, although that can be produced by accumulating successive scans and roughly approximated. The problem with linear arrays on length measuring however, is that the edge definition becomes difficult as scanning can only occur in the diametrical direction, and often sufficient lengths points are not available to give as accurate a result as possible for precision manufacture.

Figure 3:
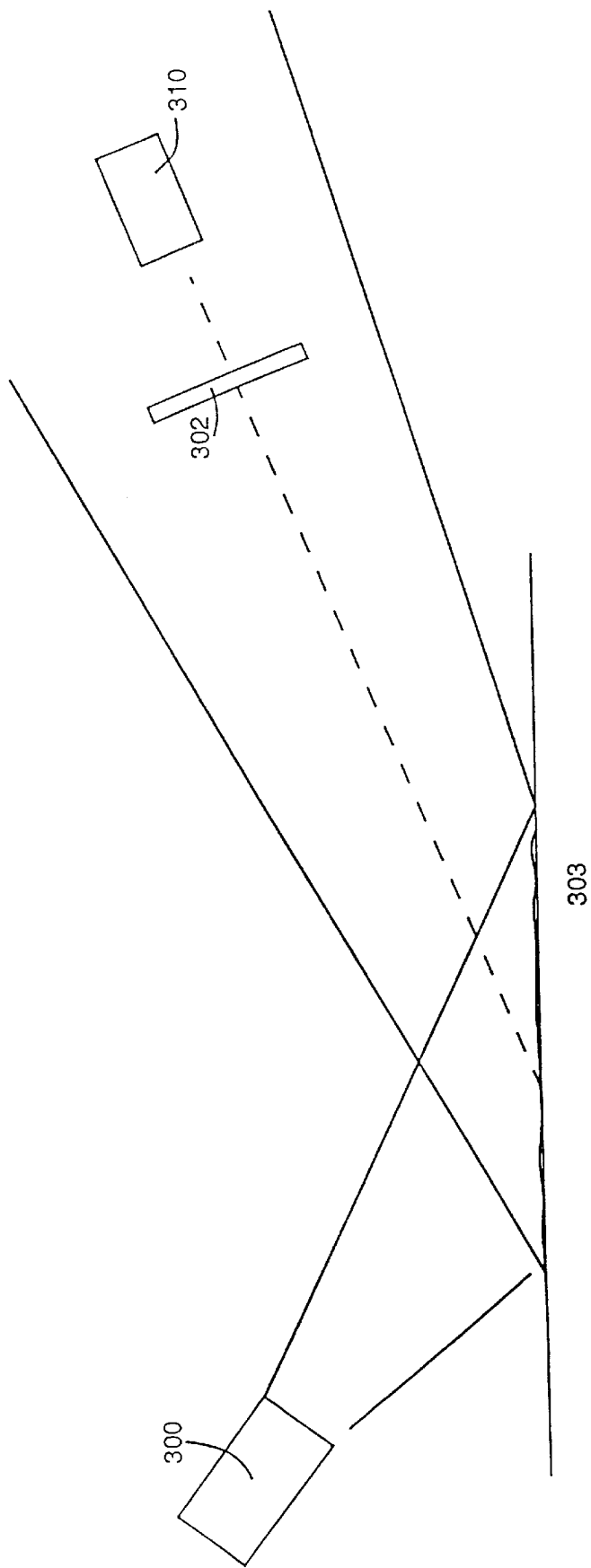
FIG. 3 is an Embodiment illustrating surface finish sensor usable he invention.

The surface finish sensor 30, one version of which is described in more detail in FIG. 3, is utilized as well to check the surface finish produced by the lathe, typically by turning or with any optional tools that might be located in lab in wheels, etc.

The surface finish sensor, as well, can be calibrated against a master ring, shown as the large ring at the end in the drawing, which can have typically as well the maximum and mean surface finishes desired on its surface. For best results the diameter of this ring should be more or less the same as the average diameter being turned for best results.

It is also possible, and desirable in many cases, to include a force sensing capability into the machine, for example the 3 axis dynamometer 90, shown under one of the tools. This dynamometer (such as the type sold by Kissler A. G.) is utilized to sense the cutting forces, and feed back to the controller signals that can stop the machine in terms of if tool breakage is detected.

More sophisticated processing of the cutting force signals can also determine if the rate at which wear is occurring, and predict the end of the useful tool life, although the data for this is largely presently available only for carbide tools. A large number of research organizations throughout the world are working on this problem, but a very small percentage of machines have these installed. Units are sold commercially by Montronix Co. and Sandvik, which in order to obviate the necessity to wire dynamometers to each tool, have utilized a dynamometer between the turret and the cross slide of the machine, thereby allowing it to be used for all tools, albeit with substantially desensitized performance.

It is not the intent of this invention to reinvent such piezoelectric force dynamometers, but only to show their beneficial use in conjunction with the optical and IR sensor data here disclosed. FIG. 5 discusses further use of the optical sensors to inspect the tool directly to confirm any wear that is being picked up by the force detectors for example. Force detectors signals can also give some feeling for the presence of surface finish variation, particularly in the chatter condition, and can again be confirmed with the surface finish sensor (and if severe, with the size sensor).

It should be noted that the feed rate of the machine can be determined from the turning grooves that are seen on the image on display 50, if desired, as can the height of the grooves on the rougher surfaces.

The disclosed invention can also be used to "trim" an existing part to size, by purposefully taking a final optimum cut to establish finish size, with other cuts matched via sensory feedback to leave the right amount of stock for the final cut.

As noted above, sensor 25 can be used to prescan a part for collision prevention purposes. However, where the part can be substantially out of location, a high precision sensor unit usable for final inspection of dimensions, grooves, etc, may have to get undesireably close to the part. In this case the sensor of 1c is used, which can triangulate from a substantial distance off the part, say to 100 mm and possibly in two axes (for diameters, and faces).

Such a electro-optical triangulation sensor can utilize a analog detector such as a UDT SC10 or a digital diode array such as a Reticon 1024G to sense the position of the image of a laser spot projected on the part surface (see reference 1). It also can be used in the invention to measure the finished part, and in some cases can be used to look at the tools as well (in another turret say).

Other sensors, such as inductance or ultrasound can also be used, but they generally do not have the resolution at a large standoff desired for mensuration purposes, even of castings. They can however be used for crude collision avoidance.

FIGURE 2

FIG. 2 of the invention illustrates the use of a matrix diode array (solid state TV camera) application for monitoring either the workpiece edge or the diameter, between two edges for application either before, during, or after turning. This sensor has been found to be uniquely effective for the turned part application, and for monitoring grooves in parts, land locations, radii, etc.

FIG. 2 illustrates the basic size and length sensor utilized together with the signal processing and machine control computer. As shown the sensor 101 is used to measure rotating workpiece or static (workpiece 105), which is worked by tool 106. Measurement can occur before working, after working, or during working of the part, as discussed herein.

The sensor is includes a light source 110, producing typically a collimated beam of light, and such light source could be a white light, LED, or in certain cases, a diode laser. The light is reflected off mirror prism or other element to illuminate the edge of the part, and this edge is imaged by solid state TV camera 115, via mirror 112 and imaging lens or lenses 113. Windows 120 on the sensor protect the optical system from flying debris, factory dirt, etc.

The air nozzle (or suction) 160 is utilized to deflect or catch flying chips, debris, etc. and where use coolant, that is being spun up by the rotation of the workpiece in those cases where the workpiece is not already cleaned sufficiently. It also serves to clear off the workpiece surface. If the workpiece was rotating in the other direction, the nozzle would be on the other side.

Typically such action would be done without the use of coolant however, the invention is still operable, even during cutting, with relatively small amounts of coolant directed, as with coolant direction micro nozzle 165, directly at the tool tip. Typically such a nozzle would be optimally built right into the tool itself, and it is the feature of the invention to be able to controllably turn this coolant off, if desirable to enhance the ability to get a good reading of the sensor unit, noting that otherwise coolant can cause erroneous readings due build up of film on the surface to the lumps of film on the surface, or can cause the windows of the system to become distorted optically. To guard against the latter, air blows such as 170 are also utilized where needed to clear the window. Fortunately for dry cutting, little or no requirement for such air usage has been required.

Signals from the camera 115 are typically processed by a frame grabber by computer system 150, typically a 386 PC operating at 33 megahertz. The image is captured by frame grabber board 151, for example a Dipix 360, and once captured are processed by the computer board 153 to determine the location of the edges, the part, and its size and length.

It is noted that in the case shown, the diameter size of the part is determinable only by calibration, since the sensors measuring the radius with respect to the center axis of the turning. Thus the computer 150 also has stored the calibration data as well to correct it for any positional variation of the machine, that desirably produced along the whole length of the part, not just in one position, through use of a calibration artifact, such as 80, in which a look up table for the correction factors are stored within the PC 150. It is noted that with the advanced controllers now being developed, it will be impossible to incorporate this complete processing system as shown, directly and desirably within the machine controller itself.

The system, as shown, is capable of running approximately 10 readings/sec maximum. This is a good result, but is short of the 30 frames per second performance of typical RS170 solid state cameras. A real time edge processor, such as 190, is being developed, which can feed all edge data at frame rates; i.e. 30 HZ, into a parallel acquisition board of the computer. It will then not force the PC's own computer to find the edges (and to disregard any contamination, etc. thereon), but only use it to do the corrections to the calibration tables, etc. It should be noted that the contamination rejection on the part surface, is desirably performed using methods described in Ref 4.

Such a real time edge processor is described in ref 2. It is noted that such processes can go faster then 30 hz as well, and specialized solid state TV cameras, not to RS170 standard, can be utilized to raise this rate substantially. European standard cameras, for example, operate at 50 hz, and specialized cameras can run several hundred frames per second. It is particularly possible if more limited fields of view are utilized. The sensor herein is capable of one micron resolution in repeatability in length and diameter over a range of 5–10 millimeters (diameter range 10–20 mm from nominal).

The computer 150 also includes optional processing, either within the main computer or within specialized "inference" cards 195, which constitutes an "inference engine". This inference capability is used to compare sensor readings taken by the sensors of the machine, and compare the data against rules, which can be used to govern the actions of the machine.

SENSOR CALIBRATION

There are several calibration issues which are solved with the invention. The first is the calibration of the sensors themselves. Clearly, when a single edge of the part is used, as with the Sensor 25 of FIG. 2, the position of the sensor in space is a function of the position of the machine axes. To establish a zero point of that axes, as well as to calibrate the sensor itself to ensure its function, a ring master (or edge portion thereof) is located at one end or the other, or both, of the machine. This ring, using the two axis scanning sensor of FIG. 2, preferably has two or more steps on it of different diameters, which can then establish the max, min and mean location of the edge and the differential between same. If the differential is correct relative to a prestored calibration for that sensor, then the sensor operation is confirmed and the remaining calibration relates to calibrating the position of the sensor as moved by the axes, providing therefore a calibration of the machine axes themselves at locations in space.

The position in space of the machine tool slide containing the sensor is then feedback to the machine to correct its axis. This calibrates the x axis travel of the machine radially, and aside from small perturbations due to non-straightness of the ways, etc. in the initial alignment of the machine, this then relates directly to the diameter of the part. For maximum accuracy and high production applications it's desirable to calibrate to a ring master roughly similar in position and size to that of the actual parts being machined, so that this calibration is as close as possible to the same point on the x axis travel of the machine.

Clearly, when a dual sensor measuring across the diameter is utilized, such as FIG. 4, such diametrical calibration is not needed, but nonetheless, for tool positioning purposes, the x axis travel can be checked in the same way. However for the dual diameter sensor, a calibration block on the opposite side of the diameter is also required to calibrate the second camera.

Sensor calibration can be done during machine unload/load cycles to minimize effect on cycle time. One view is all it takes, if the field of view of the camera of sensor 25 is big enough to see all datums of the multi-step master. Similarly the sensor for surface finish is also very fast.

If a part is inspected on a final inspection pass and found to be completely out of tolerance, one tries to determine what is wrong, since this is in theory not possible in a well controlled machine, though outliers do occur. If such is detected, a check of the master bloc at the tailstock say can be made to confirm sensor function. If okay, the part would be regauged. If it still is out of tolerance, it can be unloaded into a holding area and a second part run (or the master bar 80). If problems exist continually, the machine can be shutdown and operator intervention requested.

MACHINE CALIBRATION

The second type of calibration is of the machine itself; that is to determine where the sensor is positioned, and therefore as well the tool positions related to it, in space in the z and x axis, relative to the machine. This then can be used to establish a correction table in the computer for the variations in the machine position. Such establishment of tables on high grade machines, is sometimes done at the factory with laser interferometers etc., in a tedious process that takes days. The procedure disclosed here, provides a far faster method of accomplishing these goals, and allows such calibrations to be carried out, not only at the factory in the initial manufacture of the machine, but as well, in day in and day out production—a very big advantage, leading to much more accurate machine performance during its life.

In order to affect the machine positional calibration two of the techniques are shown. The first is Master Part 80 which contains various features such as steps and contoured shapes on it. Taking for example, particularly the steps, these are at known positions along the master bar, and can be checked with the sensor once it is calibrating for position. These positional offsets then are fed to the machine, and upgrade the machine co-ordinates due to any sort of drift or slippage with time, or with what is often the case, temperature in factory conditions.

Because the optical sensor can sense very quickly as described above, such calibrations can be carried out very rapidly, and even once per hour, for example, during periods of high temperature drift for example. The sensor performance indeed, is so quick that you could read these calibration points on the fly if the control system is capable of recording such data (almost all systems today are not). Generally therefore, the machine positions the sensor at the nominal position in x and z, and the sensor reads the difference between the true position on the calibration bar and the previously recorded position. This recorded position table then is updated for the new x and z values at that point, and the sensor moves on to the next position, which could be at different values of x and z to approximate a full calibration over the typical work volume of the parts being manufactured.

These positional calibration procedures are very important, and can eliminate the effect of backlash in the machine in so far as correct knowledge of position is concerned. They can be used to constantly compare the machine operation to baseline functions, determining if certain areas of way travel are sticking or becoming worn.

A third form of calibration of the machine is of the servo control axes. In this case, the servo constants are desired to optimize the performance of the machine from the acceleration and velocity point of view. This can be initially be set up and checked on a control system which uses the sensor data to track the position of the calibration bar at high speed. In this case, the sensor unit performed by the matrix array has to run much faster than the 30 frames/sec data rate of the Standard RS 170 cameras (North American Standard) unless such data can be strobed in with pulsed light sources at the correct time. For example, at a known point in space given by an axis reading of say 10 cm from a datum on the front of the calibration part, or on the chuck, the axis command while in motion would fire a pulse to strobe the light source with say a few nanosecond pulse (eg from a diode laser, which would freeze the data on the array, which could be read out later in sync with the strobe pulse to determine following error. This same approach can be used to measure dimension of the part under high dynamic motion and has been disclosed in ref 9.

An alternative to strobing the light source at a known location is to use a linear array capable of running several thousand readings per second, and thereby determining the position in dynamic real time of the edge of the part. (or calibration master plate).

Since the machine NC control knows where the machine should be, the sensor reads the difference from this, and the following error can therefore be directly measured, and the servo constants updated, until the following error is minimized. The ability to do this easily, and over the life of the machine, is revolutionary.

Another machine calibration is for spindle errors due to growth and runout. If the sensor 25 has been calibrated, it can measure a round master ring on the spindle, and determine thermal growth in the axial direction as well as runout. Deflection of the spindle due to machine structure deformation can also be monitored.

Force sensing and sensor calibration can also be assisted by the optical sensor, if an optically determined elastic displacement of the tool, can be equated to force as measured by strain gages in the tool or holder say (which are subject to drift and nonlinearity).

While very useful, due to its non-contact ability, and ability to read rapidly even while the part is rotating, the sensor 25 is not the only one that can be used. Similarly many aspects of this invention can also be performed with other size and length sensors than that shown. One such additional sensor utilizes a linear array where the matrix 15 is positioned, as has been amply shown in the referenced patents. Other sensors, less desirably using scanning laser beams and the like can also be used to determine diameters and lengths to some degree. These are available from a variety of vendors, such as Zygo, Techmet, and others in the U.S.

FIGURE 3

Optical scatter based sensors such as the Diffracto "Lasersort" are desirable for measuring of fine surfaces on turned shafts and other parts. These are typically turned on hardened shafts to perform bearing or seal grooves in the range of ours of 0.1–0.4 Micrometers AA and as such turning to these magnitudes can be used to replace grinding as a finishing means with highly improved results for manufacturing competitiveness.

As shown in FIG. 3, the micro finish sensor operates with very similar hardware to the size sensor, which is desirable since it can be connected. A diode laser or LED light source 300 is used to project light across the part surface (which is like the lines of a turned diffraction grating) to a matrix T.V. camera 310, which analyzes the pattern at certain locations, as projected on screen 302 after reflection from part 303.

Where feed rate is not known a priori, it can be determined by first scanning the diffraction pattern and determining the fringe spacing, which can then be related to the feed rate by using equation (1). Using a Dipix Model P360 Frame Grabber and a PC 386 running at 33 MHz, a solution can be found in 1 second.

Averaging over many degrees of rotation of the part is also an available feature, desensitizing the system to the effects of local abberations and contaminants.

Such optical scatter based probes as herein described, or those illuminating the part in a plane including the part axis at an oblique angle to the surface normal are very good at detecting process changes, such as caused by tool wear. the learning process referred to elsewhere in this disclosure can learn what process change or degradation is signaled by what changes in the scatter pattern and providing appropriate signals to the control system, such as change tool, slow down speed, etc.

The camera 310 of the surface finish sensor 3-5 can be connected to the same frame grabber as utilized with the size sensor. Indeed the Dipix 360 frame grabber used can interface to four cameras at once.

FIGURE 4

The U shaped sensor shown in FIGS. 1 and 2 for size is extremely useful, but to obtain most readings requires knowledge of its position in the x or z axis, which in itself is a function of the machine axes encoders and ways. While runout can always be determined relative to the center axis with the sensor, the diameter and ovality readings, which depend on full measurement of diameter in many cases, are desirable to be made in a system that is completely independent of the machine x axis (perpendicular to the part rotation axis). One way to achieve this is to simply have a two amera system in the u mount of FIG. 2, one camera looking at each side of the diameter. For ease of providing a small package, such matrix array cameras are typically of the sub-miniature type such as an Elmo sub-miniature RS 170 standard camera model. Processing of this is the same arrangement as shown in FIG. 2, and it is noted that the same Dipix frame grabber board (Model 360) can accept inputs from both cameras, as well as noted the surface finish sensor and the tool tip sensor, which may be used in the single lathe system of the invention.

This sensor functions very well, and as no problem whatsoever making typical diameter or length readings. It does however, have a problem with its physical size. The housing of the sensor unit can interfere with the function of the turret rotation by hitting a sidewall that in most lathes conventionally built today, at least, is quite close to the turret. This can be avoided by having some sort of retraction mechanism, but this adds complexity to the system.

The second disadvantage of the sensor is that since it must totally envelope the diameter of the part, it has a limited range of diameters that it can measure. If one makes the standoff, that is the distance from the edge of the sensor housing to the part larger, which is certainly possible optically (measurements have been made to 0.5 micron from a 100 mm standoff distance for example), then the mechanical interference problem mentioned above becomes worse.

Figure 4A:
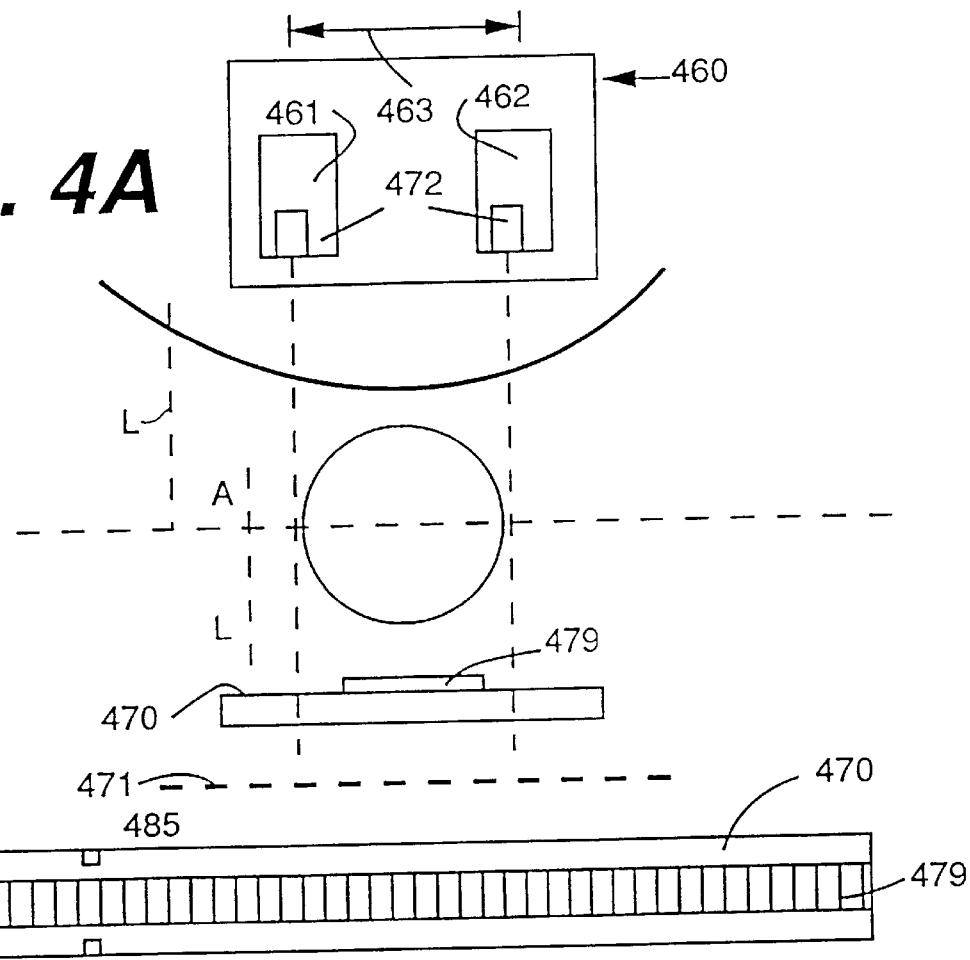
FIGS. 4A and 4B illustrate Sensors for direct diameter mensuration including an alternative retroreflective/remote light source version, also with landmark calibration of machine incorporated.

To obviate these problems, a sensor unit 460 is illustrated in FIG. 4A having Matrix cameras and lenses, pairs 461 and 462, positioned to look outward from the center of the turret. It is noted too that like the U shaped sensors, but even more conveniently these camera units can be adjustable, say on a differential screw, to position them in and out to suit different diameter ranges the cameras, then giving the readings ± from the nominal range set at differential screw 463. It is noted that this screw setting does not have to particularly accurate, since the sensors can be calibrated against the master rings at the end of the part, or against the calibration bar, as describe in FIG. 1. This movement of the arrays can be done, either manually at part changeover time, or automatically via a small motor that can engage a screw.

When the sensor unit is brought in (by action of the turret x axis slide) to an object distance L, from the part surface edge, the image of the part edge is in focus, and the readings are taken. This movement is executed by the NC machine control. It is noted the sensitivity of cameras as such that sometimes readings can be taken simply with the normal ambient lighting of the machine. However, for best results, a specialized back light source, such as a light box, extending greater than the diameter of the part 470 is utilized. As shown, this can also be a retroreflective element 471 (dotted lines) which advantageously can send quasi collimated light directly back toward light sources such as 472, carried with the sensor (see also FIG. 4b for coaxial arrangement).

This particular arrangement obviates the interference problem of the U shape design. It is noted however that the light box 470 may be desirable to place a tilted window in front of this light source to allow dirt and other things to fall or slide off it. For slant bed lathes, such as typically shown in FIG. 5c, such a light source would be naturally tilted anyway with respect to the horizontal. It is noted that the lighting is not overly sensitive given the image processing capabilities today, or edge extraction, and that only great amounts of residual dirt on this window can cause problems. The maintenance procedure of once per shift, during dry cutting operations, is sufficient generally to keep this clean enough for operation.

Also shown in FIG. 4 is a landmark plate, used for machine calibration, with similar purposes to the length calibrations, also provided by the calibration bar 80, but in this case being intrinsically in the machine, and therefore not requiring the bar to be put in place.

In this case, the light source (or retroreflector) 470 is provided with a series of calibration marks, typically rectangular such as 479 along the center axis. These are not in the way of the light source, when the part is present, because parts are always of larger diameter. The camera system, one or both cameras, shown above, or even a third camera down the centerline, specialized for the purpose, can be used to monitor the location of these points, and determine the axial variation (z) of the machine as a function of this plate. Again this plate can be made of invar, steel, glass or whatever is appropriate.

The calibration marks can also be toward the outside of the field at diameters larger than those to be measured, such as 485. In this case, they would be easier to seen with the field of the view of the cameras as shown, and could be seen even with the part in place. (although the focus is not as idea as if the part were not present and the turret further moved in X to point A, such that the object distance L to the calibration markings was achieved).

FIGURE 4B

Figure 4B:
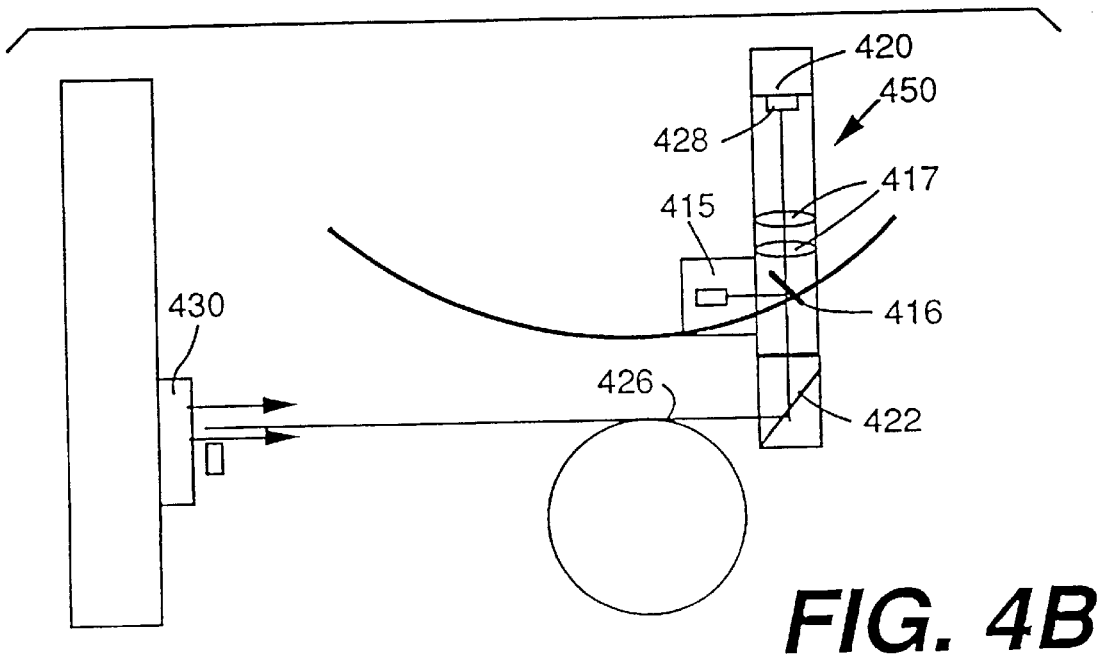

FIG. 4B illustrates use of a similar one sided "remoted light source" sensor in the turret of a lathe, instead of U shaped version, 101. This allows a smaller package to protrude from the turret, as the light source can be external (or retroreflected back. In this case the light source or retroreflector extends in the z axis as far as needed, If mounted to move with the turret this isn't far, but if mounted as shown in the figure to the machine, it would generally extend the whole range of z axis turret movement, and as far as needed in the x direction. The retroreflector is very useful for this purpose, as it is at once thin, but allows parallel illumination of the light source to be sent back. (very difficult to do with a large light box).

The position of the edge 426 of the workpiece is monitored by sensor 450 mounted to the turret. Light source 415 in sensor 450 is directed by a reflection from beam splitter 416 and mirror or pentaprism 422 to multielement retroreflector 430, (preferably scotch light 7615) which directs the light from the edge 426 back to lens system 417, which forms the image 428 of the member edge onto camera chip 420, which can either be a linear array scanning in the vertical (x) direction, or a matrix array scanning in both the vertical, and axial (z) directions of the workpiece.

By mounting to the machine, one can also carry a calibration plate in the z, and where desired, in the x axis as well (not easily achieved with the 4 A arrangement, unless a mirror is used at 90 degrees to look sideways). This can be a grating or other plate with fiducial marks known to the control computer, which can be viewed with the part absent to upgrade the calibration of the machine.

Fiducials can also be looked at with the part in place to allow measurement (and correction if needed) of location of the turret in x and z before indexing of the tool into position.

The calibration plate of FIG. 4b can also have on it a form suitable for the servo control calibration. (as discussed in FIG. 1). This would exercise the z axis or x axis servos, if a sign wave type pattern, or a triangle, or square wave, was put on, and the measuring system was of sufficiently high speed to see it.

FIGURE 5

Illustrated is a Two Turret Four axis version of the invention which I have found preferable for such applications.

Also shown in FIG. 5 is the operator readout of the part dimension and surface shape, particularly underneath the tool, when utilized with a twin turret type application as shown.

A unique capability of the invention becomes evident when it is equipped on a two turret, or commonly called four axis lathe, which each of the two turrets is movable in x & y. Typically these are used, equipped with tools, such that different ID's and OD's of parts can be machine turned at once, or in some cases, two different sections of the OD. In the invention however, while this particular operation can be continued in lathes equipped with the invention, in this case it is also possible to locate "sensor" tools on the lathe which can be used to monitor the part, independent of the cutting action. This allows then the ability of one turret, equipped with a sensor, to track the other that is doing the machining, thereby making monitoring operations while cutting.

When dry cutting is used, and particularly when the working tool, such as a cutting tool in this lathe case, or grinding wheel in the case of a grinder, is located below, and the sensor unit above, realizing that on slant bed lathes while opposite, these are not a perfect top and bottom dead center, as shown. The machine is capable of monitoring while cutting with almost no contamination problem as all. This is a uniquely beneficial result, since even at high rpm's and hard turning of hardened steel the machine can accurately monitor.

In addition illustrated is a infrared thermal sensor for workpiece temperature monitoring, as will be described.

The force sensing shown is that known in the art for dynamometers to be placed, either directly underneath the tool holder or underneath the turret, such as the Automation Intelligence, Montronix, etc. systems. Shown herein is a specialized version, utilizing the optically monitored deflection of the tool holder.

Figure 5A:
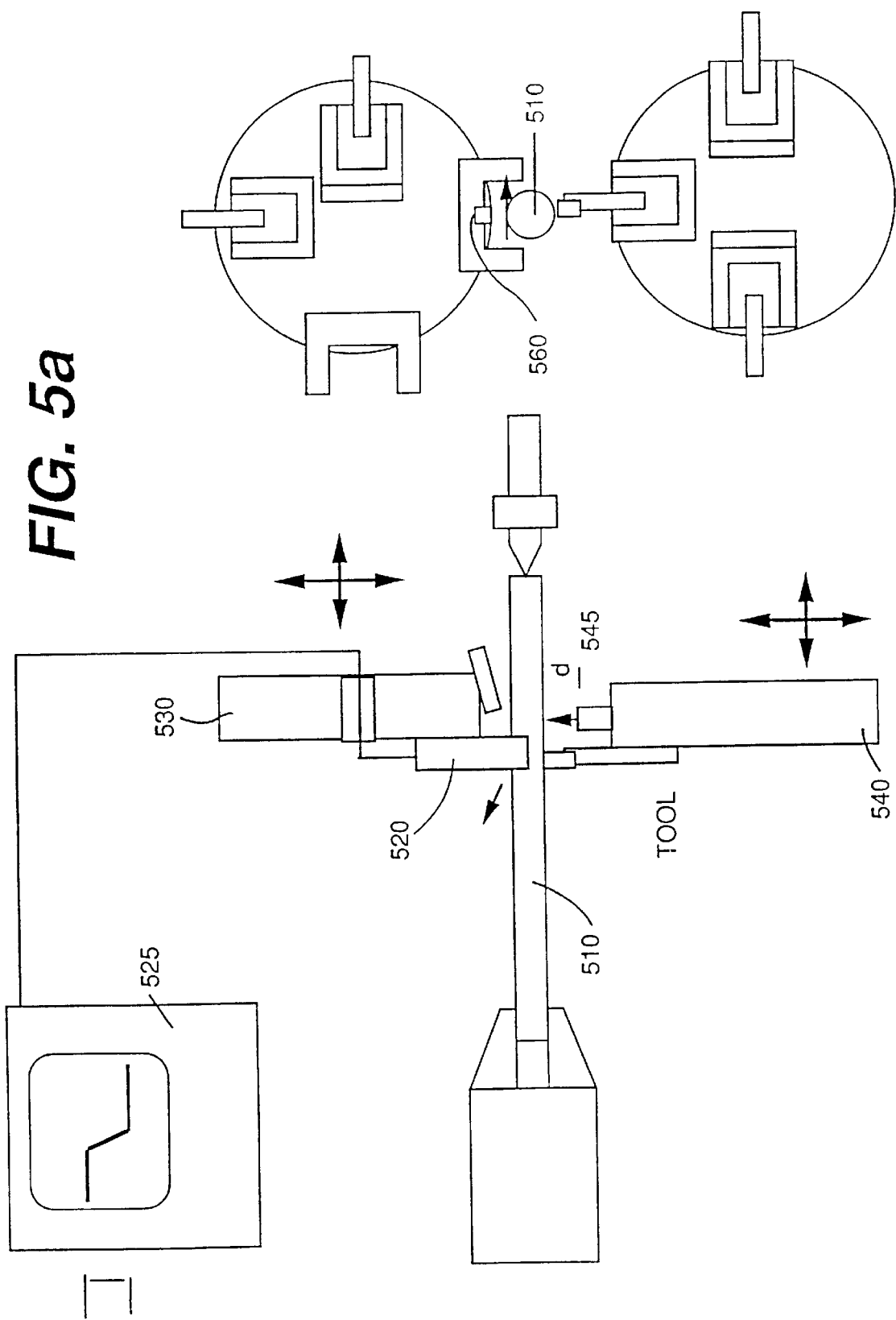
FIGS. 5a, 5B, 5C and 5D illustrate a Two turret configuration, sensors above, tools below. Tracking and measurement of axial dimension, diameter, and surface finish, and infrared temperature sensing and correction, tool monitoring and cutting face monitoring are also illustrated.
Figure 5B:
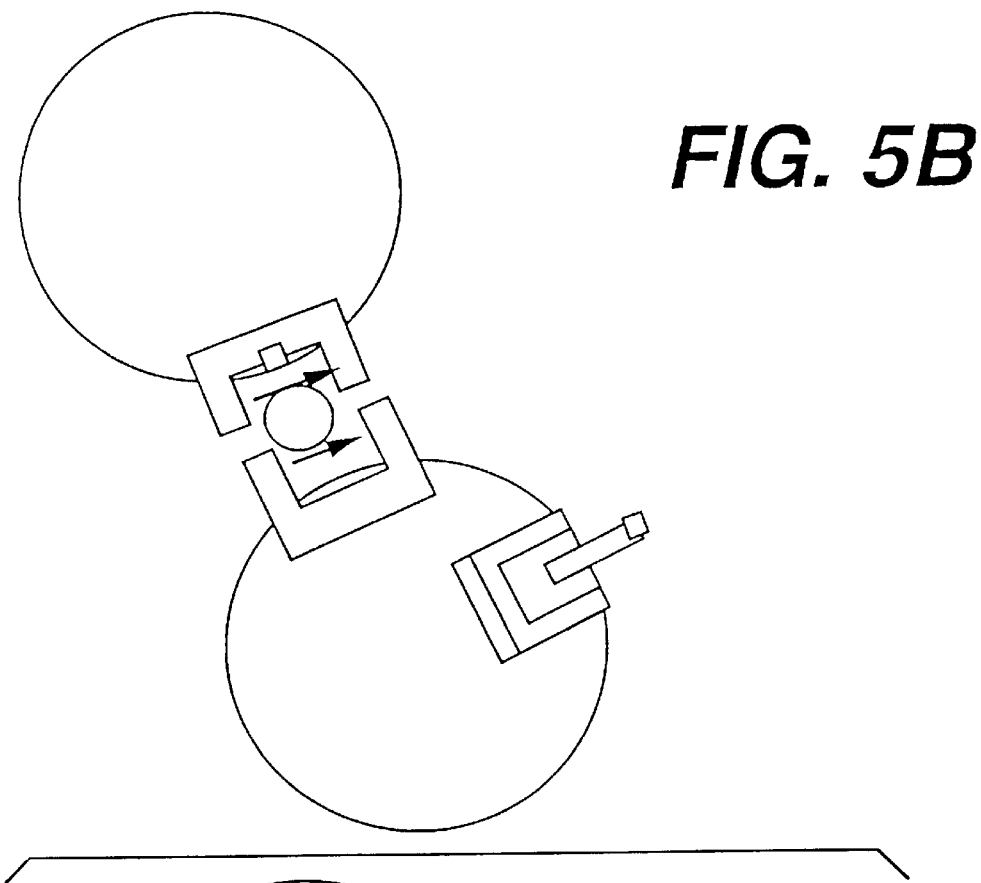

FIG. 5A illustrates a desirable 4 axis embodiment of the invention, in which a typical 2 turret, 4 axis lathe sold widely in the open market, contains in the upper turret the sensors, and in the lower turret the tools. I have found that this is a desirable arrangement from the point of view of sensor cleanliness, and would be true of grinding operations as well, with a grinding wheel located in place of the cutting tool. In this particular application, typically both turrets are individually positionable, which is highly desirable for sensor position relative to the working tools. It is not however necessary to only have tools in the lower turret, as shown in FIG. 5B, for example, sensors as well can be so located, as is also the case tools can be located in the upper turret, together with the sensors.

Vis a vis FIG. 1, several features are here disclosed. First, because contamination is basically directed away by the rotation of the workpiece, the matrix array sensor unit, such as FIG. 2 operable here (1520) can produce an image of the surface while it is being cut. This then gives the display, such as shown on monitor 525, which is greatly magnified to show the depth of the cut (typically for finished surfaces 0.003", although for rough surfaces this can be substantially higher), and gives the operator a distinct feel for what is going on, during the cutting process.

It is noted that the upper turret 530 can be individually positionable relative to the lower turret 540, containing in this case the tool, can therefore either position the sensor ahead of the cut, entirely behind the cut, or as shown straddling the cut. It can also, of course, be used to measure the part completely independent of the cutting operation, as described relative to FIG. 1 for pre or post process measurement.

The control signals from the readout of the sensor can be fed directly into the machine control to allow it to maintain this diameter at the precise location desired, and the depth of the cut as well. Both machine controls however cannot accept data dynamically like this, and new machine controllers are being developed therefore. Typically today's controllers can only accept a correction value after the complete machining cycle is finished (also called a tool offset).

The ability to see while cutting, and in the region of the cut, means that the optical sensor herein can be used to detect the effect of catastrophic tool breakage on the part surface. Either the matrix array based OD sensor, or the surface finish sensor, is capable of signalling a tool withdrawal command to the machine within a part revolution or so.

As shown, air or suction is optionally employed herein as well, located in this case on the upper turret, to blow any residual contamination, that does not go downward, after cutting away from the part surface being measured, as well as the sensor window. In this case, the direction of blow is actually along the part surface. The effect of this, also including air nozzle 160, shown in FIG. 2, is generally sufficient to take care of almost all chip conditions in at least finished turning, notice to date.

Also illustrated in FIG. 5A is the sensing of the temperature of the part 510, using an infrared temperature sensor 560, which is to correct the position of the machine to effectively move the tool position to cut the surface in the position that it would be had the temperature of the part been at an ambient temperature of the machine and parts coming into the machine. This then corrects for the build up of temperature in the part, due to the working of the tool. Additional sensors can also be incorporated to correct even this value for changes in the ambient temperature of the machine, caused by the working and motor temperatures, etc. This sensor data is fed into computer 150, and either corrects using a formula or a correction table to correct the measurement readings. The tool position data calculated from the measurement readings for these temperature effects.

For example, an equation of this is shown as follows, where it is assumed that the part has heated up uniformly. (if not a distribution function is required, or a empirically derived correction table') The constant k in this case relates to the measured temperature rise on the surface of the part, and relates it to the bulk temperature rise determined empirically or theoretically for this particular part.

Tool position=Actual tool position$-K^*(T_{part}-T_{machine})^*$Diameter of part desired at machine ambient temp, $T_{machine}$ where larger values of tool position are closer to the centerline of the part and machine.

FIG. 5B illustrates a tilted turret and workpiece arrangement typically of a slant bed lathe, the most common variety. It is meant further to illustrate the use of both the surface finish sensor, and the surface size sensor at once for post process measurement. In other words, another function of the two turret lathe is to bring these sensors in and be able to scan down the surface of the part, from both sides, either from cutting the inspection time in half for both surface and size. Clearly the surface finish sensor might also be co-located with the size sensor in some miniaturized form in order to accomplish the same thing with only one turret.

Figure 5C:
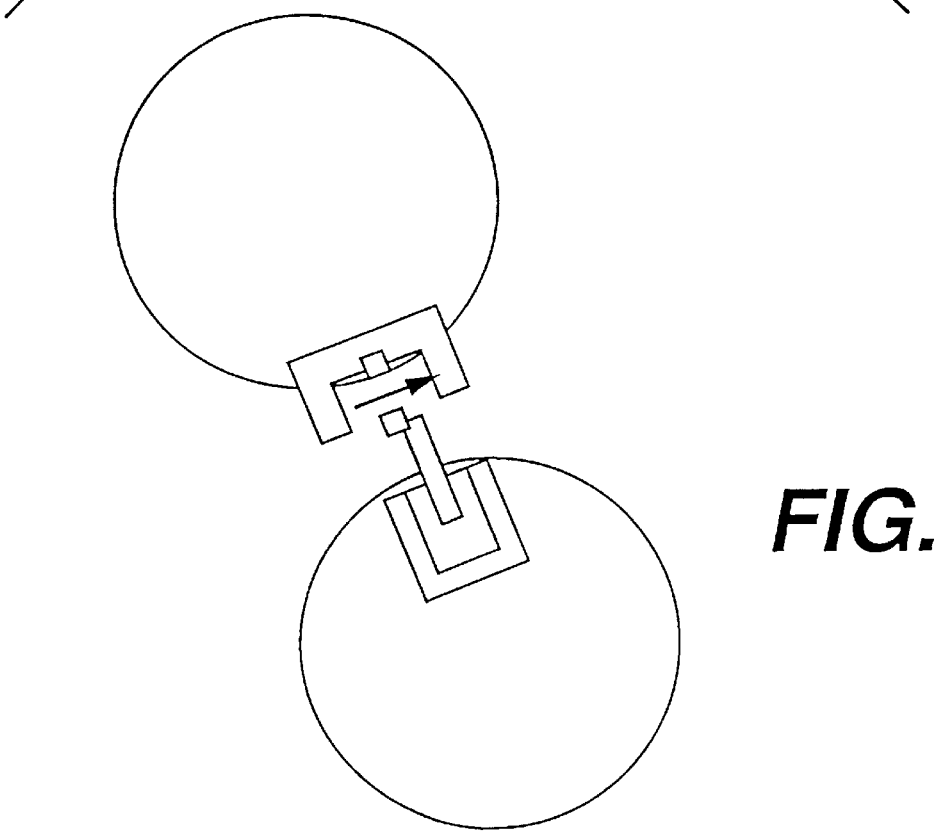

FIG. 5C illustrates another variation, in which the tool located in the lower turret in this case, is measured directed with the size sensor of the type shown in FIG. 2 in the upper turret. This gives an image very similar to that 96 shown, except that the tool nose radius area may not be as optimally positioned in angle $\phi$, as would be desired (noting the turret could rotate slightly to an intermediate point if able to facilitate this) but otherwise can perform determinine at least elements of the position and wear of the tool.

The twin turret lathe offers a lot of flexibility to the sensor intensive adaptive control of the process 1. You can index or change tools while measuring a part with the other turret 2. you can calibrate the optical sensor system in one turret while cutting in the other turret 3. you can measure or cut a part, using a programmed air blow off in the other turret (or on the machine) to clean the part or a sensor (an example of the latter is to put a window blow off at the calibration area near the tailstock, or chuck)

4. You can have lights or reflectors on one turret, with sensors on the other using same.

It is noted that sensors of parts do not be in the tool holder locations on the turret but can be elsewhere on the machine. A non contact sensor such as optical triangulation sensor can be mounted to the turret housing or on the plate which rotates with the tools. This sensor can be brought in to measure the part whenever desired, and is particularly useful if it has a long standoff, such as 75 mm or more. This allows the sensor to measure incoming parts to determine if they are positioned correctly with acceptable runout after rotation is commenced, without fear of crashing a misloaded part. If the part is misloaded, the sensor retracts and a new attempt to load the part is called for.

The operative mode shown in FIG. 5 is quite interesting in the sense that the operator can see immediately from the display a substantial increase in feed rate. For example, it was noticed that when the feed rate was increased from 3 thousandths of an inch per revolution to 10 thousandths of an inch per revolution, that the effect on the surface of the part in terms of the "groove" heights and their spacing was immediately visible. The magnification of the sensor is generally such that only 0.0003" per pixel is occupied in a typical example. For a 1,000 element array therefore, the range would be 0.3", or ±0.3 in the diameter case.

FIGURE 5D

Figure 5D:
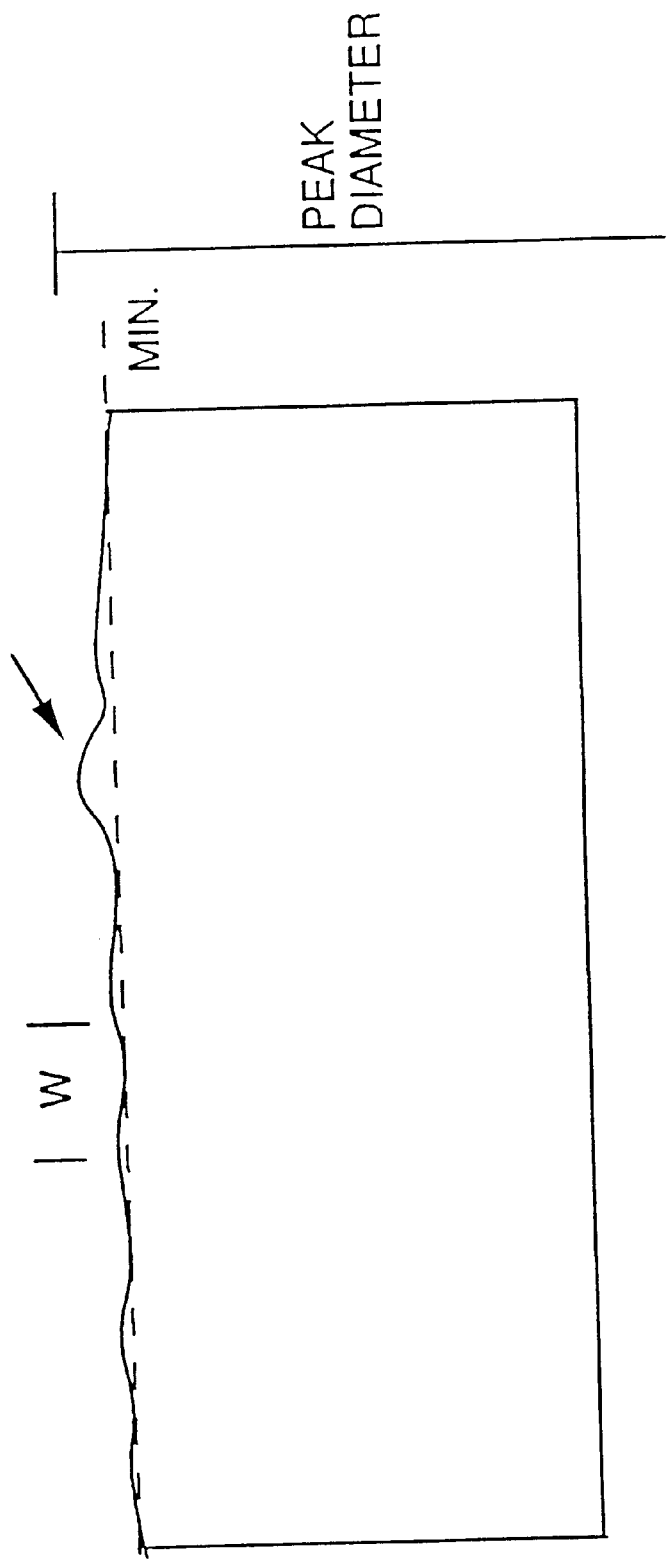

Accuracy however is substantially better than 0.0003" since the sub pixel resolutions of at least 16x can be obtained. It is thus seen that the one micron accuracy spec quoted herein for this particular sensor is rather conservative, although clearly a certain amount of line by line averaging has to occur in order to read the turn marks. This is shown in FIG. 5D where the feed rate on the surface results in a wavelength at w, between the turning grooves, and the height of the grooves is relatively uniform, although variant with certain machine perturbations, and in the one case, a potential dirt spot or mark, or chip. It is noted that the actual dimension is taken typically from an average of a number of turned grooves, for example 10–20 such readings, which include both the peaks and the valleys. If any one reading is above a certain threshold, either absolute or percentage of the particular diametral locations read, this can be eliminated as a potential cause of dirt. It can also be eliminated if it is higher than the average of the rest of the readings by some threshold.

One can also measure the peak values of each of the readings, and average them, taking perhaps a few more readings such as 50 across the surface in order to obtain a sufficient number of peaks. For example in 50 readings across 10 (approximately $\frac{1}{10}$th to $\frac{1}{12}$th the array width in any field of view, for example), one would have, let us say, 10 lines of data that corresponded to the 10 peaks at an 0.005" feed rate that lay within the field. In other words, one could take the 10 highest readings, and average them, determine the surface peak location, being careful that if any reading was substantially higher than the rest, that it be eliminated for probable cause of contamination (contamination as pointed out in refs above always resulting in a larger material condition being observed; i.e. a larger apparent diameter). It is noted that similarly to finding the peak diameters, one can also find the minimum diameters however, this is somewhat more difficult as it is much harder to see in profile down into the roots of some of these grooves, but nonetheless impossible in the cases of the rougher finishes. Because of this, indeed the mean diameter, usually measured is somewhat weighted toward the peak.

It should be noted however that in tests run, the coolant even if saturating the part surface, typical water soluble coolant in the order of 30 parts water to one part oil will drip off the surface to leave a residual detectable film of 0.0001" or less within approximately one second, with the action of the spinning of the part, which is typical for such measurements since it is not desired to stop the part for measurement if at all possible, this takes place even sooner, so that actual coolant on the part is not so much the issue, except at the very highest accuracies, as is the coolant flying through the air and hitting the windows of the sensor, or otherwise interrupting, or refracting the light beam, or image.

Even in this latter case, some sort of refraction can be tolerated if enough measuring points along the edge of the part to get a satisfactory diameter reading are unaffected. This is the same argument as one being able to see with glasses on, even though the droplets of water, or other contamination are on the glasses.

If such processing is required one can simply scan a larger field of view, rather than just, let us say, taking an average of 10–50 lines, as might normally done, as shown in FIG. 2B. For example, one might take a look at the complete width of the field of view, which can be 600 or 700 lines, and pick those areas of the field of view that have no noticeable ripple in them due to refraction. Such ripple can be clearly seen because it is different than the expected ripple of the part surface due to the feed rate, which is generally small, and of a frequency and approximate height known to the computer, or one can also look for only those part surfaces that are in expected locations.

For example, it is clear that a journal diameter being cut to high tolerances with an NC lathe is going to generally be within 0.0005" of where the optical sensor is positioned, and the dimension expected in the image. If it isn't, massive tool wear, breakage, or in this case, gross refraction of optical images are present. In short, if any readings are obtained, that are in the expected locations, those are considered as valid, and the other readings that constitute distorted image positions due to coolant refraction and the like are ignored. Clearly however, alarms need to be enacted to eventually cause the windows to be cleaned since eventually such conditions may allow the whole window and part operating environment to be obscured and/or contaminated beyond some threshold of acceptance.

One problem of adding sensors into the machining tool locations on the turrets is that present lathes are simply not set up for the wiring required. Where sensor wires extend from the turret locations, a key item is to restrict the movements of the turret from free rotation; that is once a rotation of let us say 360° has been obtained, the turret has to be indexed back in the other direction. This causes a slight loss of tool change time under certain conditions, but is relatively small, and in some cases non-existent.

A better solution, shown in FIGS. 1 and 5 is to have the wires running through a hollow bore in the turret mounting shaft, which is a convenient way to do it. Present lathes however do not have such hollow bores, except in some cases for coolant passage.

One arrangement, is to simply not have any wires, but to run the sensors from batteries and transmit by modulated infrared or radio as is commonly done for certain touch probes. This is possible, but adds cost and complexity.

A second arrangement is to have a connector play such as 315 in FIG. 1 which is connected to the sensor as the turret is activated back to send in its coupling at the position desired.

CASTING OPTIMIZATION

A major goal of this invention is to optimize the production of castings and their machining. The invention which adds a very rapid sensory capability in to the machine tool, allows one to provide a number of new features, which can be of great aid in optimizing the casting process, particularly for "near net shape production", as well as for the most efficient utilization of the material produced, and its machine time. While we are particularly here concentrating on casting, the same arguments in general apply to forging, and other forming processes, used to produce parts ready for the final machining process.

A particular argument is this. As presently manufactured, castings are made with a degree of left over stock, as the casting process cannot ensure that the walls will either clean up (that is allow sufficient stock to be there for the machining to put the finish surface on, without leaving uncut areas), or the stock will not be excessive and cause an undue amount of machining time, or if truly excessive, a smashed machine.

It should be noted that present day machine tool controllers drive the tools on preset paths. In other words the tool goes to a specific point in space and begins its cut. If the casting is oversize this cut then tries to take too much material off, and can either ruin the part, or the machine, or both. In the case of expensive parts (turbine blisk blanks costing $10,000), this can be a disaster right there. The problem is machine damage however, n the case of machines tying up whole production lines, as in automotive The invention herein includes the methods for essentially premeasuring the part surface in critical areas, and in compensating the machine path to take this into account, up to and including actual rejection of the workpiece, if it is deemed having insufficient material to clean up.

It is not thought by the inventor that some of these concepts per se are necessarily new. However what is new, is the ability to actually implement them into a high production process at an economic price using the sensory equipment on the machines, such as shown in this invention. Doing so, opens up then, a whole new frontier, and particularly in high volume as in the automotive practice, where such compensation for the parts is never done.

Some of these concepts are included in Ref 5. The difference herein is that the sensing systems are located in the machine itself. This has two advantages. First, it allows, if the sensing can be made quickly (and only optical appears to meet this) so that cycle time is only modestly impacted. Second, the data produced is essentially "free", as the sensors such as 25 used for the machined surface, can also be used for the raw or semifinished part. In other words, one had to load the casting into the machine anyway, but in so doing can obtain the scan in a relatively short period of time, this period of time being acceptable when one adds up the benefits.

A major benefit is that immediate feedback of data to the casting process is provided in order to allow the casting to be made in a more near net shape manner. This has many benefits from the reduction of machining time point of view, the better utilization of material, and the decreased wall thickness. By sensing every part, or every 10th part, or whatever amount is considered rational, a data base for these castings can be developed, and one can continually feedback data to the casting process.

One can make critical measurements not only for the machining points of view but also to aid in the analysis by the casting plant as to the distribution of metal stock within casting in the alignment and shape, and design of cores used therein. In other words, unlike present day sensing devices, it is not just envisioned that one would rapidly inspect the casting in the machine for things that relate to the machining process alone, such as presence of sufficient stock, presence of excessive flash and mislocation in the machine (the latter two likely causing the part to be rejected), but that the key features on the casting would be determined periodically in the machine and used to help rationally control the casting process. For this reason these machines would likely to actually be located near or in the foundry to allow the shortest feedback time of such data. This includes measuring data on, let us say, the outside features of castings, which can allow positions of inner features to be determined by foundry to obtain near net shape conditions of say wall thickness and the like.

If the high speed sensing of incoming parts is done every cycle then the casting plant can try for the ultimate in near net shape production, having the confidence that if one in 1/1000 parts say is undersized, that it will be caught and rejected at the machine tool. The other 999 parts have clearly benefitted from having less stock to remove, resulting in machine time savings and smaller capital investments. Checking each cycle also allows one to catch misloaded part conditions before machining and thus avoid a crash.

A flow of activity is:
1. Load part into machine.
2. Rapidly measure key part features, using non contact sensors where possible.
3. Determine if part is mislocated (eg due to dirt in chuck) or won't clean up in subsequent planned machining operations. If so, exit (or reload/rechuck).
4. If not within predetermined tolerances, determine best cutting sequence—Number of cuts, depth, start point of cuts, etc, and alter machine program accordingly (not now possible with the vast majority of existing controllers.)
5. Cut Part.
7. Inspect part in machine to insure correct size and clean up (optional).
8. Check tool if desired to determine wear, correct position for size (if correction not made as a result of step 7 above).

Where forgings are concerned, the prescan afforded in the machine tool of the invention can allow detection of conditions indicative of die displacement, die wear, inadequate metal and other unwanted conditions, and similar feedback to that process can occur—also allowing far more near net shape production.

FIGURE 6

Figure 6:
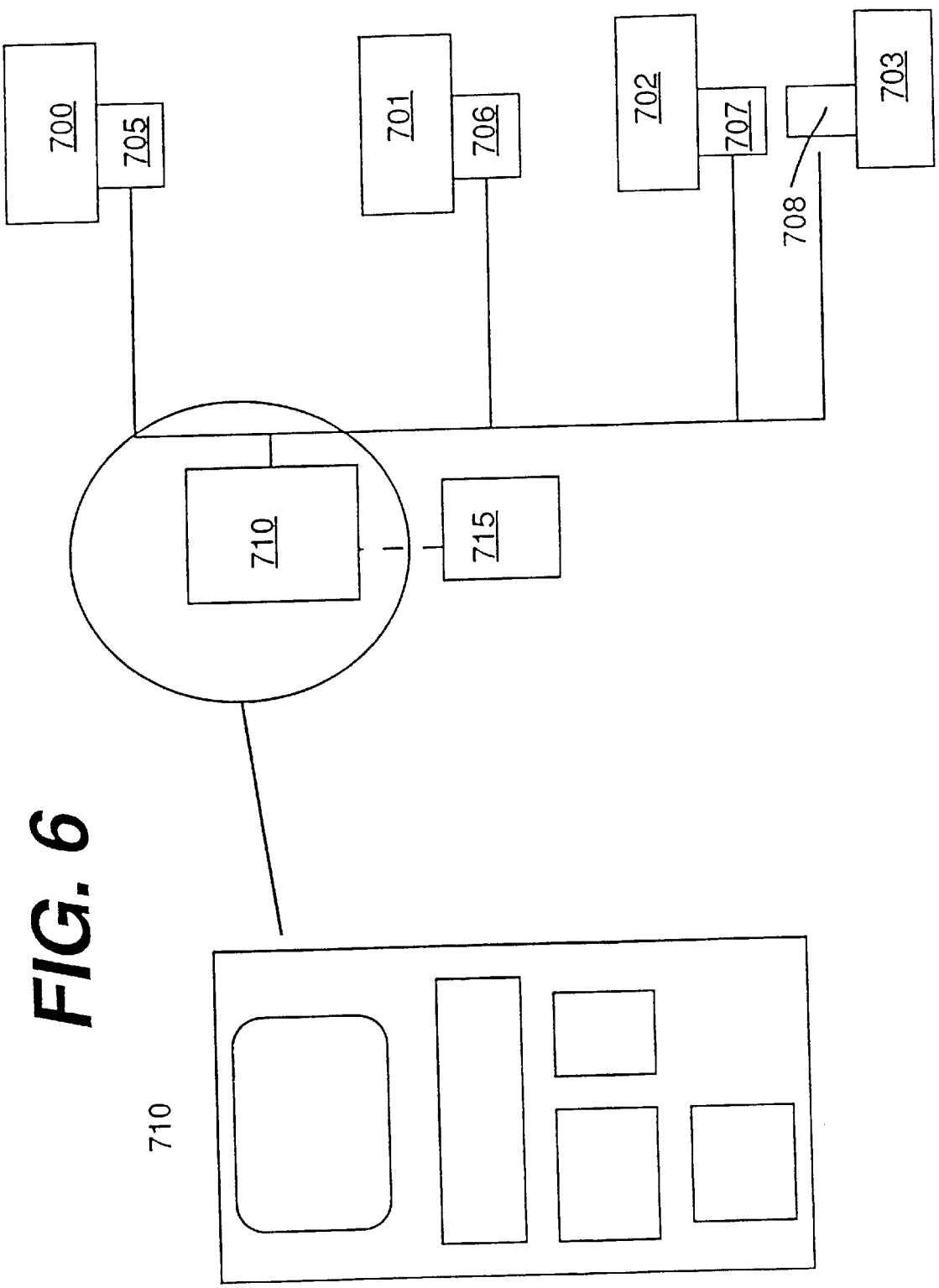
FIG. 6 illustrates a system to optimize high volume production of one or more machines is illustrated in FIG. 7, including both non real time, and real time sensor functions in machine, an further including operation of a control system in setup and un modes.

FIG. 6 illustrates one embodiment of a control system of the invention in which one or in this case a group of machines 700–703 are controlled by a central computer 710. Each machine operates its own real time control portion 705–708, responding immediately to tool breakage, say (by retracting the tool'). However non time critical control functions, data base management and general operator interaction is achieved remotely at computer 710 shown. Optional Operator displays are also located at the machines for ease of use during setup and trouble shooting (not shown for clarity.).

Generally such a group would be similar machines, but this is not necessary. Even different types, such as mills and lathes can be so controlled, by what might be called an intelligent "cell controller"—realizing that there could be no real relationship between the parts being machined, the common definition of such work cells.

This computer has within it a data base obtained from measuring of the sensors of the machine(s), and process models containing control algorithms. It also can contain a machinability data base for accessing cutting data for materials and tools used, and a part data base obtained from a CAD or other design data source, for the various parts to be produced by the machines.

The operator display is intended to give a variety of information. (and can have satellite displays at each machine as well). A partial list for example is:

SPC charts of part data taken from each machine (the ability of the invention to generate such data directly, with out additional post process gages, conveyors and operators is a major economic benefit).

Individual charts of part or machine and tool sensor data for a specific machine run.

Tool performance data.

Intelligence algorithms in use, and their effect on machine performance, including estimated results if they are changed.

Video displays of cutting actions.

Machine diagnostic predictions and analyzes from sensor and other data.

It is noted that this control system can be a key part of a "Dimensional control network", by using data from manual gages or CMMs (eg at station 715) to measure parts produced, and compare this data to data taken from theon-machine sensors, either tool or part size on the machine. Minimal outside manual gaging activity is required given the ability of the on machine sensors to determine, and control, size.

FIGURE 7

Figure 7:
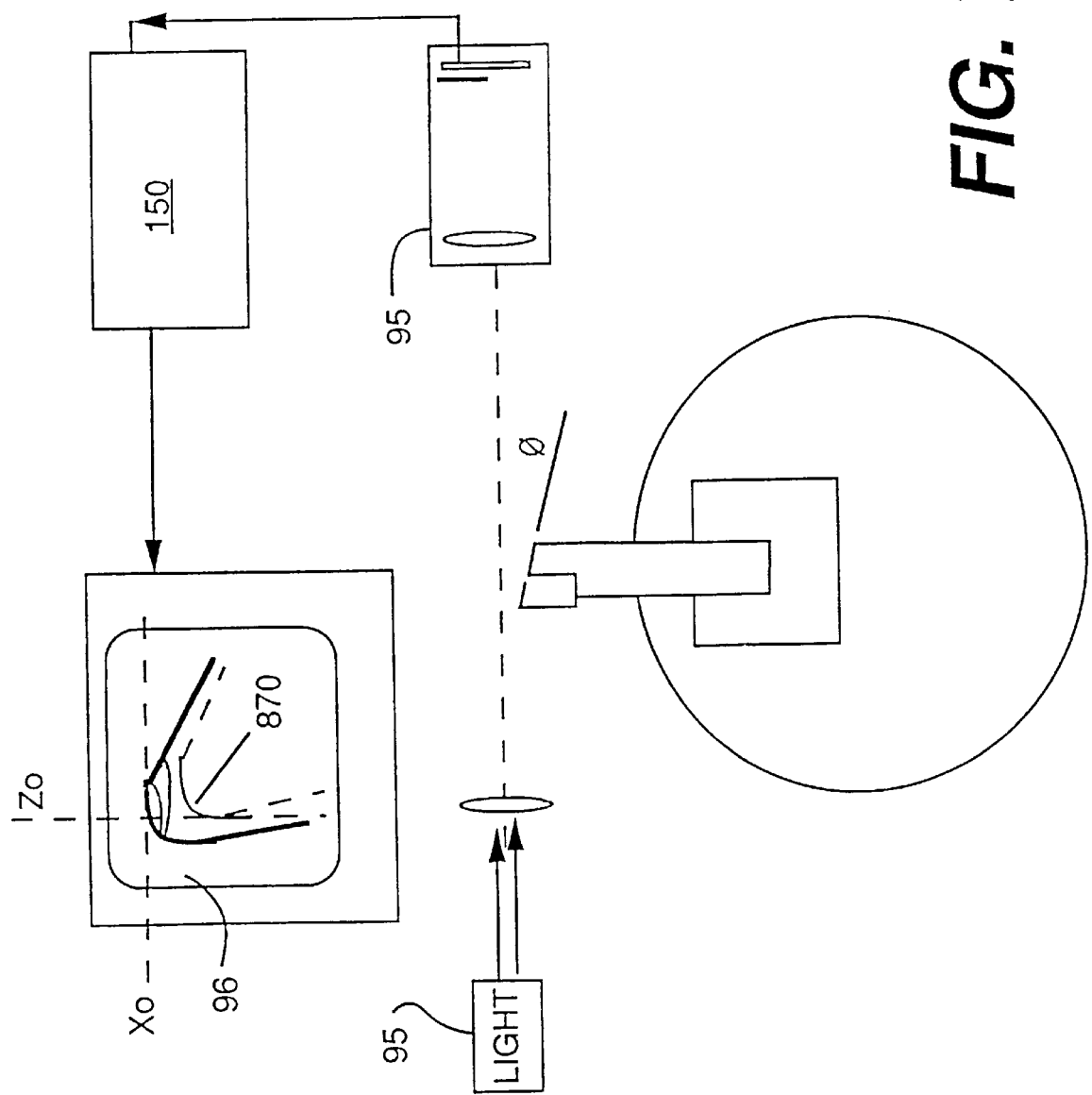
FIG. 7 illustrates a tool sensing embodiment.

A separate tool sensor unit, such as 95 shown at FIG. 1, can be mounted on the machine, for example, wherein the tool is moved into position to check its location and length, and wear, or breakage if any, using the camera system virtually identical to that of FIG. 2. As shown in FIG. 7, this sensor may be cocked at an angle $\phi$ to the face of the tool insert shown, to provide a clear edge image. The operator display 96, which shows the tool tip being located at nominal position $X_0$ and $Z_0$. As tool tip is worn away as shown in dotted lines with the course of the machine, $X_0$ and $Z_0$ change. The new positions of $X_0$ and $Z_0$ can be calculated by computer 150 as well as any positional variations in the machine itself, such as due to thermal build up, which physically move the tool as a whole can all be corrected in the computer and communicated to the machine controller to return the tool to the optimal cutting position remake the part desired. When the wear becomes too great, typically in the order of 0.005–0.0101" deep, and the tool needs to be replaced. This also becomes evident in surface finish degradation typically on the surface, which also can be sensed by the invention (for example using the apparatus of FIG. 3).

FIGURE 8A

FIG. 8 illustrates in more detail the lathe tool sensing arrangement of FIG. 7. Before doing so, FIG. 8A illustrates a cutting condition common today in the turning art. A cylindrical part 850 is being cut by tool insert 851, separated from tool holder 852 typically by a spacer 853. An optional force and/or acceleration sensor 857 is used to determine cutting force related characteristics. For best results this should be as close a possible to the tool, but wiring and other problems have typically made the location somewhat remote.

The cutting action due to the rotation of the part (shown rotating in a counter clockwise direction), creates chip 854, and an associated wearing of the tool face 858 due to the chip, which is categorized in the literature as "crater wear".

FIGURE 8B

As seen in the side view of FIG. 8B, the depth of cut being taken, 860, creates as well wear on the tool flank 859. The particular tool noted in FIG. 8B is equipped with a flag or other indica 865, according to the invention, which will be discussed below. The rectangle 866 delineates the imaged zone of the tool and part, either/or, which is also used in the invention.

FIGURE 8C

A close-up of the tool edge is shown in FIG. 8C, in which the nose radius section of the tool 868, is shown, and it is typically this zone that is imaged by the camera system, for maximum resolution determination of tool wear. Where only an indication of gross breakage is desired, the camera of the invention can image a larger zone of the tool, allowing different types of tools, possibly different locations to be placed in front of the camera, used in this case to simply see if they were broken (such as broken tool image 869). However, for the maximum resolution of breakage (for example of a 0.001" chip off of ceramic tools 871), and particularly wear, one needs a higher magnification that often relatively limited field of view, of typically 1 cm square or less being taken, as shown.

FIGURE 8D

At this point, we need to consider the situation from the optical imaging and measurement point of view. A goal is to accurately measure the wear of the tool, and, as well, the position of the tool. Particularly in FIG. 1*b* above, and expanded here in FIG. 8D, we see that where the tool is at a substantial angle $\phi$ with respect to the tangential direction to the part, a distinct optical image can be formed of the cutting edge, with no appreciable confusing reflections from the relief face, 870.

However, as this angle $\phi$ is decreased, as it often is in practice to near zero numbers, optical determination of the edge condition becomes more difficult.

I have found therefore, that it is desirable when measuring such tools, to measure at a direction which is not in the tangential direction y, with respect to the part, as has been shown, but at a larger angle with respect to the tangential such as $\phi$. Indeed a typical value of $\phi$ is in the range of 0–6°, whereas in the case here disclosed, I have found that the best angles $\phi$ for tool edge mensuration in a dependable manner that corresponds to tool wear, are indeed between 20–70°, and a figure of 45° has been used in many tests.

Use of angle's $\phi$ of this magnitude results in creating a new form of reliable and accurate tool characterization, capable of use in machines proper, where the measured value is a composite of the effects caused by crater wear and flank wear. Unlike references in the literature, I feel the exact type of wear in this case is not of interest, only that it results in the wearing down of the edge. Typically too in many processes one type of wear or the other will predominate, and a choice of the angle $\phi$ can tend to accentuate the sensitivity to one or the other. I have found, for example, that the angles that emphasize flank wear are typically of the most used. Indeed for certain type of ceramic tools, the crater wear is almost non-existent, but the tool destruction comes from a chipping action of the edge. It is uncertain, illuminating larger angles why such techniques have not been used to study tool wear before, and I believe that this is the first known application.

It is noted that the light source and camera based sensor can also be located on a movable actuator to bring it into position to measure the tool, if desired. This way it can be way from contamination and out of the way of the machine movements when not needed.

If we look now at a representative operator display of the zone 868, shown in FIG. 8C, we see that such a display of this composite edge condition can be very useful. First the position of a new tool can be determined in memory, and the position of edge locations, either clue to additional tools that are put in, or due to wear in the tool, can be compared. This also can be used to determine the accuracy of the machine to bring the tool back to a previous position (indicated to the operator in the stored image 870 shown in dotted lines).

The operator can set a crosshair, if he desires, at the location at which the new tool is located, and make all comparisons from there. Conversely the machine can be directed to position the tool at the mean position on the screen, and from which the crosshair can be used to visually depict the differences caused by wear or other conditions.

FIGURE 8E

Tests also indicate that the finish and size of the parts produced with a tool measured in this manner, and these effects as well can be displayed to the operator in a data display, such as that shown in FIG. 8E. Such data can be overlaid with the image visual data of the part or tool, or both (as shown), including any profile changes occurring in either due to tool wear or other causes.

Note that the tool in this case is worn away, by an amount "h" using the wear algorithm chosen, and the effective cutting size is determined by line A—A, which has been shown cutting part to size 54.555 mm The NC control unit of the machine can be commanded by intelligence computer 150, for example, to change the tool when a pre-determined finish value predicted by wear related erosion of the tool edge has been exceeded, or to offset the tool when a given size has been exceeded. The machine can check the tool, at a more frequent interval (e.g. after each cut, when it is reaching the end of its life, as predicted from the number of parts cut, if such data is available (as it often is in high production applications). In low production applications, the time of cutting, as opposed to the number of parts usually, becomes the criteria for more frequent inspection of the tool, for example.

FIGURE 9

Generally speaking the machine is used to take the tool over to a measurement position, as has been shown above, and is independent of the measurement of the part. However, it is also possible to measure the tool in conjunction with the part, and this is shown in FIG. 9A. In this case, the camera sensor is mounted actually on the tool holder itself. A TV camera based sensor 890, including optics and imaging chip, such as an Elmo Brand EM 102BW is used to image the tool edge 891, when illuminated by light from an external or retroreflective mirror source, such as shown above.

In this case, the camera can be used to create an image of the situation shown in FIG. 8B (camera view within the rectangle shown). Indeed if the tool is raised off the part a slight amount, tool and part information can be measured at once, given a sufficient field of view of the camera (FIG. 9B), with the tool edge to part distance x visible directly thereby allowing the machine to potentially reduce its position error, as it only has to accurately position over the range x plus the depth of cut desired to achieve a final dimension. The tool edge, and the nose radius area, the part throughout the depth of cut, and both the rough dimension of the part, and the final dimension of the part, all can be measured relative to each other, and to the absolute co-ordinates of the machine to the extent that the tool sensor is properly related thereto.

Where the sensor is mounted to the tool holder 852, the machine x axis repeatability usually determines the accuracy of the tool and part location. However, sensor 890 can alternately be mounted to the base of the machine, or to the carriage of the machine, disconnected from the tool holder. In this case the measurements are all taken relative to the machine axis itself, to which the part is located on centers.

The ability to view the actual cutting location, and indeed while cutting, as I have found, given the fact that the chip is directed away from the camera, one can see the chip move away from the camera and determine roughly its length and width. One can also see the part dimensions ahead of and behind the tool. One cannot however determine the actual dimension at the exact point of contact due to the obscuration caused by the tool. However, by use of a 'flag', or other indication 865 on the tool one can infer the location of the edge, since at a withdrawn location the flag edge to tool edge dimension can be determined.

One can determine these valuable characteristics, including the direct measurement of the depth of cut, while cutting, and its variation. The prediction of problems due to any sort of oversize stock ahead of the cutter can be made, and one can make an ideal depth of cut, without knowing anything at all about the part a priori, or the position of the machine by direct measurement of the locations of the surfaces, and then providing signals to the machine to move the tool in such a manner as to cause the depth of cut. of a certain size to occur. Then if desired, one can inspect the surface cut to make sure that it is correct.

While having a proper depth of cut for a given speed, feed, and other cutting conditions is desirable, the actual desired result is generally the finished dimension of the part, not the amount of material removed in a depth of cut. Thus depth of cut information is mainly valuable for determining how many passes it may take to remove the material to get to the correct size, for a given combination of machine, tools and rough part, for any given combination of machine settings.

Another application then of the camera (or other measuring system) of the invention in looking at the area around where the tool is cutting, even if it is displaced angularly therefrom is to look at the formation of the cut, and to determine the exact location that the cutter should remove the material independent of the axes of the machine. While machines today are quite good, the fact remains that they have variances in their positioning capability, particularly as the machine ages, and also the tool itself can deflect and wear. All of these can add up to an improbability of manufacturing turned parts beyond a certain dimensional size range.

FIGURE 10

FIG. 10A illustrates the measurement of breakage, wear, and position of a milling tool, or boring tool according to the invention, which can also be monitored at various angles, not only the tangential, but at angles other than tangential to the tool rotation. It is noted to that the tool edge can be sensed either continuously while rotating, or at discreet stopped positions. Indeed one can read tool edge data at various rotation angles, by simply taking different points along the rotation, such as shown in FIGS. 10A and 10B. One can keep track of the positions, with encoders in the rotation of the tool, and even position the tools at a fixed point, or can read them on the fly, using pulsing techniques described in the references, or using high speed shutters on the camera unit. By using different angles, different tool wear/breakage characteristics can be monitored.

CONFIRMATION OF TOOL BREAKAGE

In the discussion relative to FIG. 1 above, it is mentioned that one can confirm the actions of a tool force sensor in giving out a collision, or breakage, or wear signal by looking at the tool with an optical tool sensor. This is proven to be a very important aspect of the invention. As noted above, the commercial force sensors by themselves have not been well received in the trade, because of the difficulty in determining valid force signals amongst all of the other noise created by the machine and cutting action.

The invention herein in one stroke solves this historic problem in the machine tool industry by creating a mechanism by which the sensed data from the force sensor can be used, as now, to shut the machine down, but in this case retract the tool into the tool inspection position, where the optical sensor of the invention measures the shape of the tool and determines whether the tool is broken (due to either a break of the insert, in operation, or out and out crash, and two determines any wear thereon. In fact, the sensor used solely for breakage can have a much coarser resolution as pointed out above, then the one used for wear, which has to detect small changes, particularly so if it is going to be used to predict an accurate side from the sensed tool datum.

The biggest concern in high production applications with such tool force monitoring is most desired (due to unattended operation and the resultant impossibility of an operator detecting a crash either audibly or visibly), is that the sensor unit has the ability to determine if the break has indeed occurred, and if not, the primary worry of most production people, who are nervous, is that they false trigger of a force sensor and cause their machine, and even the whole line, with which it is associated to be shut down. The tool sensing parameters can be actually reset to be somewhat less sensitive to the conditions that cause the break. This means that over a period of time, and for a given batch of stock the machine can actually learn what the correct settings are.

In operation, one would start with the most sensitive setting of the force criteria for breakage determination, such as looking at the force ratio between the tangential and radial forces, for example. Then after a false trigger, the sensitivity for activation could be reduced. Or, even more intelligently, if the signals of individual forces both tangential and radial had been stored, and one was seen to be not indicative of the break condition on reflection, just its amplification constant say could be changed.

This ability of the invention to compare previous signals of transducers, based on analysis of actual results on the tool or part gathered by reliable sensors is a major feature of the invention.

The other advantage of the use of the force or acceleration sensors as a trip wire, with a final arbiter of breakage to be made by the optical sensor, is that in many cases, a simpler monitoring of the suspect condition of the machine or tool can be utilized. This is particularly true, since we are not concerned with the occasional false reject, since in many cases, the tool monitoring cycle can be shared in time with the load/unload cycle of the machine, and therefore costs little or nothing in terms of machine cycle. This means that the more dependable use, for example, of 2 axis force plates under the turret on NC lathes, and even 3 axis force plates for maximum prediction of wear that have been marketed to date, are not necessarily required. A single axis of force in the lathe case, particularly in the radial,tangential, or axial direction, or some other signal from the machine, such as acceleration from one or more accelerometers located on the machine, or even in certain cases, electrical load monitoring of the motor currents of the spindle, or the axes drives can all be used as potential trip wire signals.

Indeed because of the inventions ability to check the work of the signal monitoring, the sensing unit can, generally speaking, be less sophisticated, and possibly less intrusive into the machine's environment, than the force monitoring devices, used heretofore, which typically (if they are reliable at all) have been expensive, and require substantial machine modifications.

FIGURE 11

Another aspect of the invention is that it allows the machine, as noted above, to teach itself what is the correct response for the given tool force scenario. This aspect of the invention has 3 major advantages:

1. It allows one to start out sensitive, and slowly become less so in an orderly manner, such that the correct settings for a particular machining scenario are arrived at. Indeed, these settings can be different for the each of the tools in a given turret, for example, which is another capability not present in today's machine tools. The reason it is not there is probably because of the fact that the existing sensing units, in order to obtain reliable signals, have to have painstaking operator setting for each individual condition, which most operators and plants are not willing to do.

2. It allows one to develop these criteria automatically in the machine itself without such painstaking work, and this allows the sensing to be used for a larger variety of tools and part conditions, including parts which vary in hardness, batch to batch, or in their depths of cuts, or other conditions that are often ignored in manufacturing research laboratory work, but are very prevalent on the factory floor.

3. It can allow the integration of multiple sensory inputs. For example, a basic setting for an accelerometer such as 994 on the turret of the lathe of FIG. 11, combined with, let us say, a load monitoring current sensor on the machine, for example, 995 on the spindle drive.

This allows the acceleration sensor to look for crashes, which cause unmistakable acceleration and seismic signals, and indeed allows one to take 2–3 readings of such accelerometers at different locations, and correlate them so that coincident events can be registered as a true signal. Conversely the much more slowly responding signals are those of the current monitoring on the spindle and axis motor drives. In this case, sole build-ups of tool forces due to changes in the cutting tool surface are the usual results. Although in the case of the tool break, in most cases, the currents also go up, and in many cases this is sufficient to signal the potential change of tool. Again though, because of the difficulties in assuring this, the optical sensor of the invention is a major step forward to assisting this.

Similar to the above lathe related portions of the invention, it is possible to use the sensed tool force signal from the force plate 950, typically measuring the sheer stress on the plate that is a function of tooling forces, to act as a trip wire to cause the tool to check itself on the next cycle for example, due to a potential break, or to even stop machining, and go back to a checking position. It is noted that strain gaged bolts, such as 980, mounting the system can also be used, as can other methods, such as strain gaged spindle bearings. Even simple load monitoring of the drive to the spindle, or the feed force can create signatures, which can act as a potential trip wire to engage the optical sensor tool edge check.

The sensing of broken boring or milling or drilling or tapping tools can also be operated on the trip wire approach mentioned above for lathes. In this case, the broken tool sensing cycle (optional) is ideally actuated when the force signals suggest that there is reasonable probability that the tool is broken, or becoming dull through wear to the extent where change or rotation of the insert might be needed. In this case, the shutter on the optical sensor can open up and the sensor can make the reading.

It is noted that the Tool sensor qualifies tool, and correlate the breakdown of tool to wear and breaks via a "Look back" and teach function. This allows one to analyze what the tool shape history was as a too progressed to breakage, and after a significant amount of data is taken, this pattern can be used to look at a given tool and its history, and determine if, and when, it is likely to break (or, if some other issue studied, such as surface finish history of parts) when it would make a bad part.

The Following are a list of steps for various functions discussed above.

Action on Receiving a Tool Break Signal from force based or other real time sensors–one example.

A tool break signal received.

Machine stopped, tool retracted, coolant turned off.

Tool moved to inspection position. If used, tool sensor actuated out from protective housing behind machine bulkhead or guard.

Image token of tool is Tool broken?

If No:

Tool break sensor force characteristic signal optionally modified, and indication of this action displayed. Purpose of modifying is to generally reduce sensitivity of the force sensor to extraneous circumstances, such as hard spots on material, etc., causing false broken tool detection.

If tool broken, tool is changed.

Is part worth re-cutting?

If no, part ejected and new part loaded, and machining commenced.

If yes, tool moved to previous stop, and re-cut commenced. This re-cut may be desirable to use the camera system of the invention to guide the machine to the proper point at which to begin the cut again, so that there is not a mark on the part, due to the fact that the juxtaposition of the old and new points was not achieved.

Note that in both of the above situations, it may be desirable to store the optical and force signals relating to the event for further analysis, in order that more improved operation of the sensing system or machine can be judged, and algorithms for all sorts of operations be generated.

Tool Cleanliness Steps Optionally Used In Above Tool Inspection

Tool removed from cutting area, and a) wiped, b) blown off, c) flushed with coolant, for any or all of the above, if possible before inspection. Coolant turned off if desired (to avoid splatter toward inspection area).

Tool checked with optical system of invention.

Is tool edge image satisfactory? If yes, make analysis.

If substantial material in excess of the expected tool edge contour is present, and measurement is not possible, tool is deemed to be excessively contaminated.

If so, repeat or commence blow-off, flush or wipe operation. Read again. If tool edge meets expected criterion, store reading and make comparison to determine whether or not the shape is within bounds to create a correct finish and size part.

This criterion is typically one that meets the previously noted shape, with little or no maximum material perturbations beyond that shape.

If not okay, assume that a built up edge condition, or other problem condition exists, such as a chip wrapped around the tool.

If so:

a) abort and sense after next cut, during which presumably this condition is removed.

b) run a special cut: in an unused part of the material to remove this indication and recheck.

c) engage more forceful removal means.

d) Call for maintenance and/or change tool.

It is noted that just as the tool sensor 75 can sense the position of tool 35 and confirm they are in the correct position when the turret is placed in a known location by the machine controller, so can the sensed positions of the tool be used to offset the tool position in the computer to reflect its actual position with respect to the machine axes.

This is true in the boring tool case as well, except here it is the tool edge which is moved outward to a stationary tool sensor, and its new position confirmed say. as being at the correct location to bore the diameter desired.

The optical systems disclosed herein can operate with any light that can be detected by the typical array based detectors that are used. This typically runs from the ultra-violet to the near infra-red. It should be noted to that the concepts herein, while preferably executed with linear array based systems, are not so limited, and in fact sensor systems of all optical types and other measuring types can be used herein. However, the array based systems over time have shown themselves to be the most useful for these tasks being drift free and capable of large ranges and high resolutions required.

Tool inspection by the invention can be done during part load unload cycles to cause the least effect on cycle time of the machine. Tool contour variation due to wear and the progressive degradation of the tool can be charted to allow a prediction to be made of the point of tool breakage, with such a prediction, tool inspections and part inspection frequency can be raised toward the end of tool life to assure that proper function is maintained. Force signals if available, can signal a break of the tool, to allow a safe shutdown of the operation.

There are numerous control scenarios possible for the disclosed intelligent machining systems. In the simplest case one simply measures the actual location of the part and offsets the machine's NCcontroller with an RS232 or other signal to the control, after the process step is complete. Most commercial controllers have this capability to take data from some outside gage source, as well as from their manual entry on the front panel.

Where dynamic scanning of the part is concerned, most machine tool controllers (eg. FANUC 15) do not give out data as to where the sensor is located on a moment to moment basis. For diameter measurement, this is not a problem, nor is it for out of round measurements, since rotation rate is known. Nor is it a problem where the machine is instructed to stop at an axial point say and read a length. But for contour measurements, made axially, or circumferentially, a more intimate real time connection to the controller axes is required, in order to link sensor data with location on the part, or force sensor data with respect to location of the tool in the tool path program.

Non contact sensors are preferably electro-optical for part dimension, but can be capacitive, infrared, ultrasonic, and acoustic emission or ultrasonic for dimension, or finish or internal defects.

What is claimed is:

1. A method for determining tool breakage in a machine tool comprising the steps of:

providing an electro-optical sensor in said machine tool capable of automatically determining a shape of the cutting edge of said tool, automatically sensing a physical characteristic of an operation of said machine tool during cutting with said cutting edge, automatically determining that the sensed value of the operation of the machine tool has provided information indicative of a potential break of the cutting edge of said tool, automatically examining the shape of said tool with said electro-optical sensor when information indicative of a potential break has been sensed, and automatically determining if said shape is also indicative of tool breakage.

2. A method according to claim 1, further comprising the steps of:

illuminating the edge of said tool, imaging said tool edge onto a two dimensional image scanning device, scanning said tool edge image by computer from the data obtained from the positions on said device, determining the two dimensional contour of the tool edge with the computer.

3. A method according to claim 2 wherein a display of said contour of the tool edge is made.

4. A method according to claim 2 wherein a display is further able to display a previous or expected tool contour.

5. A method according to claim 1 and further including the step of:

interrupting of said cut when information indicative of a potential break has been determined immediately to perform the automatic electro-optical examination of said tool shape.

6. A method according to claim 1 wherein the physical characteristic sensed is force.

7. A method according to claim 1 wherein a two dimensional shape of the cutting edge is determined and examined with the electro-optical sensor.

8. A method according to claim 1 wherein said examining step examines a shape of an edge of the tool.

9. A method according to claim 8 wherein said determining step determines if an edge of the tool is broken.

* * * * *